United States Patent
Moser et al.

(10) Patent No.: US 9,296,475 B2
(45) Date of Patent: *Mar. 29, 2016

(54) SYSTEM AND METHOD FOR REDUCING THE STOPPING DISTANCE OF AN AIRCRAFT

(71) Applicant: The Boeing Company, Chicago, IL (US)

(72) Inventors: Matthew A. Moser, Marysville, WA (US); David D. Leopold, Seattle, WA (US); Michael R. Finn, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 291 days.

This patent is subject to a terminal disclaimer.

(21) Appl. No.: 14/035,030

(22) Filed: Sep. 24, 2013

(65) Prior Publication Data

US 2015/0102166 A1    Apr. 16, 2015

(51) Int. Cl.
*B64C 25/42* (2006.01)
*G05D 1/00* (2006.01)

(52) U.S. Cl.
CPC .............. *B64C 25/426* (2013.01); *B64C 25/423* (2013.01); *G05D 1/0083* (2013.01)

(58) Field of Classification Search
CPC .... B64C 25/423; B64C 25/426; B64C 9/323; B64C 9/326; B64C 9/32
See application file for complete search history.

(56) References Cited

U.S. PATENT DOCUMENTS

| | | | |
|---|---|---|---|
| 2,350,751 A | 6/1944 | Spitzer | |
| 3,618,880 A | 11/1971 | Bissell et al. | |
| 3,822,047 A | 7/1974 | Schuldt, Jr. | |
| 4,372,507 A * | 2/1983 | Denniston | 244/113 |
| 4,725,026 A | 2/1988 | Krafka et al. | |
| 4,729,528 A | 3/1988 | Borzachillo | |
| 4,821,981 A | 4/1989 | Gangsaas et al. | |
| 4,838,503 A | 6/1989 | Williams | |
| 5,839,699 A | 11/1998 | Bliesner | |
| 6,152,405 A | 11/2000 | Muller | |
| 7,494,094 B2 * | 2/2009 | Good et al. | 244/215 |
| 7,556,224 B2 | 7/2009 | Johnson | |
| 7,641,152 B2 | 1/2010 | Onu et al. | |
| 7,720,579 B2 | 5/2010 | Goodman | |
| 7,726,610 B2 | 6/2010 | Good et al. | |

(Continued)

FOREIGN PATENT DOCUMENTS

EP    0193442       9/1986
EP    1547917 A1    6/2005

(Continued)

OTHER PUBLICATIONS

Airbus, "Getting to Grips with Aircraft Performance," Jan. 2002.

(Continued)

*Primary Examiner* — Justin Benedik
*Assistant Examiner* — George Andonyan

(57) ABSTRACT

A system for reducing a stopping distance of an aircraft may include an edge control system configured to control a leading edge device mounted to a wing of an aircraft. The edge control system may be configured to automatically command extension of the leading edge device from a first position to a second position in response to deployment of a spoiler if a ground speed of the aircraft is greater than a threshold ground speed.

13 Claims, 13 Drawing Sheets

(56) References Cited

U.S. PATENT DOCUMENTS

| | | | |
|---|---|---|---|
| 8,356,766 | B2 | 1/2013 | Garthaffner |
| 8,424,810 | B1 | 4/2013 | Shmilovich et al. |
| 2005/0011994 | A1 | 1/2005 | Sakurai et al. |
| 2005/0151028 | A1 | 7/2005 | Pohl |
| 2005/0263644 | A1* | 12/2005 | Beaujard et al. ........... 244/99.12 |
| 2006/0049308 | A1 | 3/2006 | Good et al. |
| 2007/0262207 | A1* | 11/2007 | Morgenstern et al. ........ 244/214 |
| 2008/0154445 | A1* | 6/2008 | Goodman et al. ................ 701/3 |
| 2009/0212158 | A1* | 8/2009 | Mabe et al. .................... 244/1 N |
| 2010/0200704 | A1 | 8/2010 | Berens et al. |
| 2011/0127385 | A1 | 6/2011 | Morris |
| 2012/0032030 | A1 | 2/2012 | Ruckes et al. |
| 2012/0104184 | A1* | 5/2012 | Weber et al. ................ 244/76 C |
| 2012/0193183 | A1* | 8/2012 | Gunter et al. ................ 192/48.1 |
| 2013/0020432 | A1* | 1/2013 | Yogev et al. .................... 244/51 |
| 2014/0257603 | A1* | 9/2014 | McKeown et al. ............. 701/16 |

FOREIGN PATENT DOCUMENTS

| | | |
|---|---|---|
| EP | 2465770 | 6/2012 |
| FR | 2902756 | 12/2007 |
| GB | 2186849 | 8/1987 |
| WO | WO9915403 | 4/1999 |

OTHER PUBLICATIONS

Delta Virtual Airlines, "Boeing 777-200ER Aircraft Operating Manual," Nov. 2005.

The Boeing Company, "777 Flight Crew Operations Manual—Flight Controls," Dec. 15, 2003.

Boeing Aero, "Rejected Takeoff Studies," 3rd Qtr. 2000.

Extended European Search Report dated Oct. 15, 2015 for EP14185988.

* cited by examiner

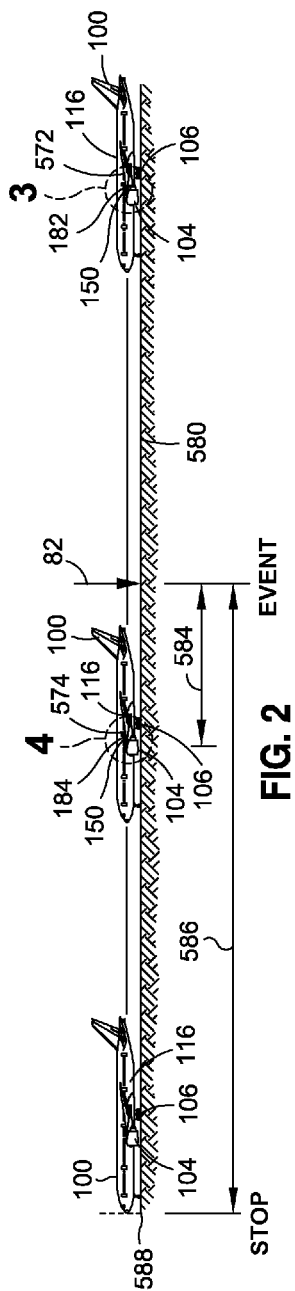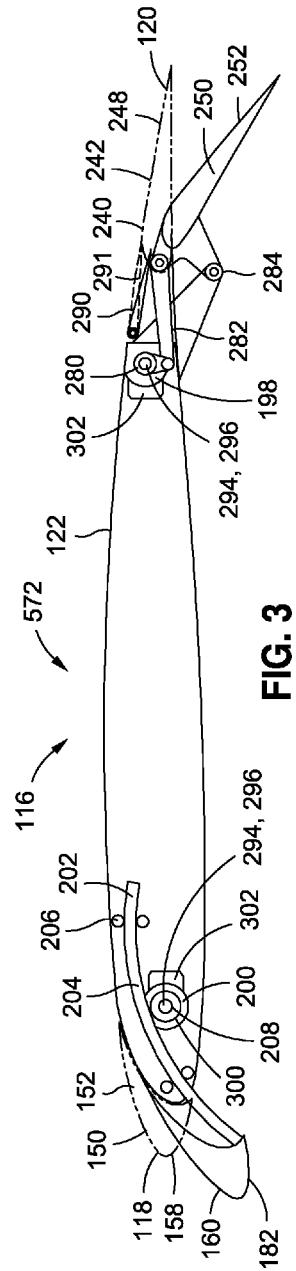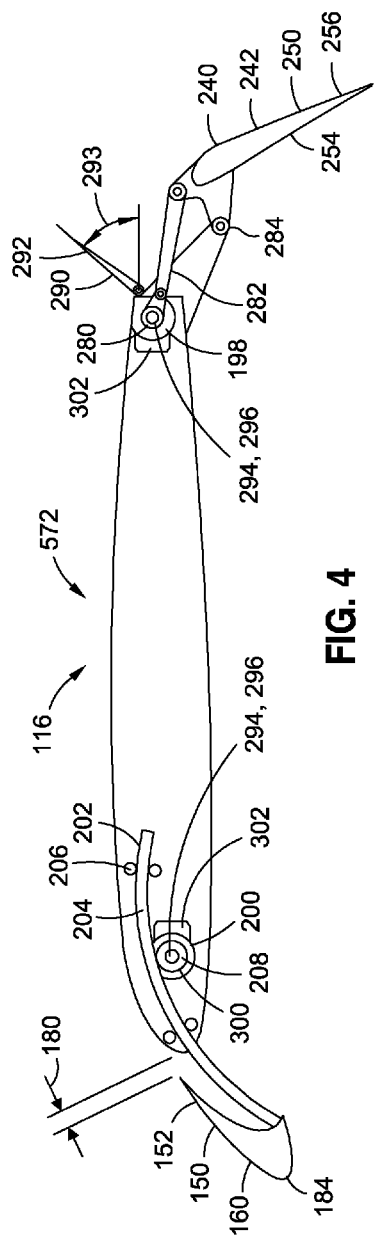

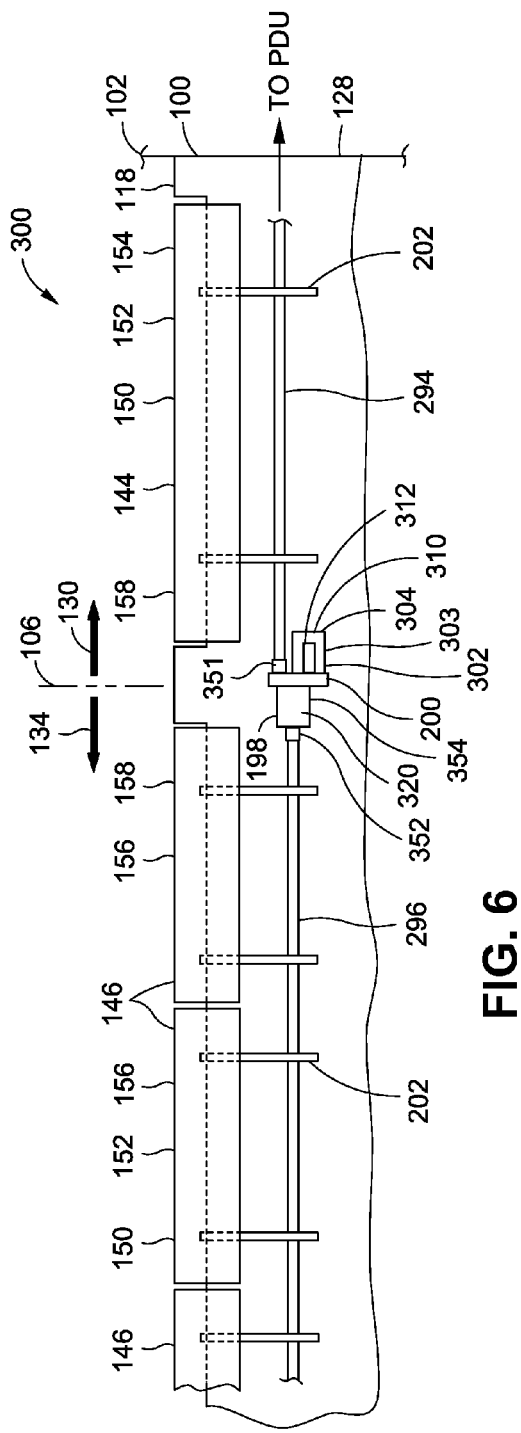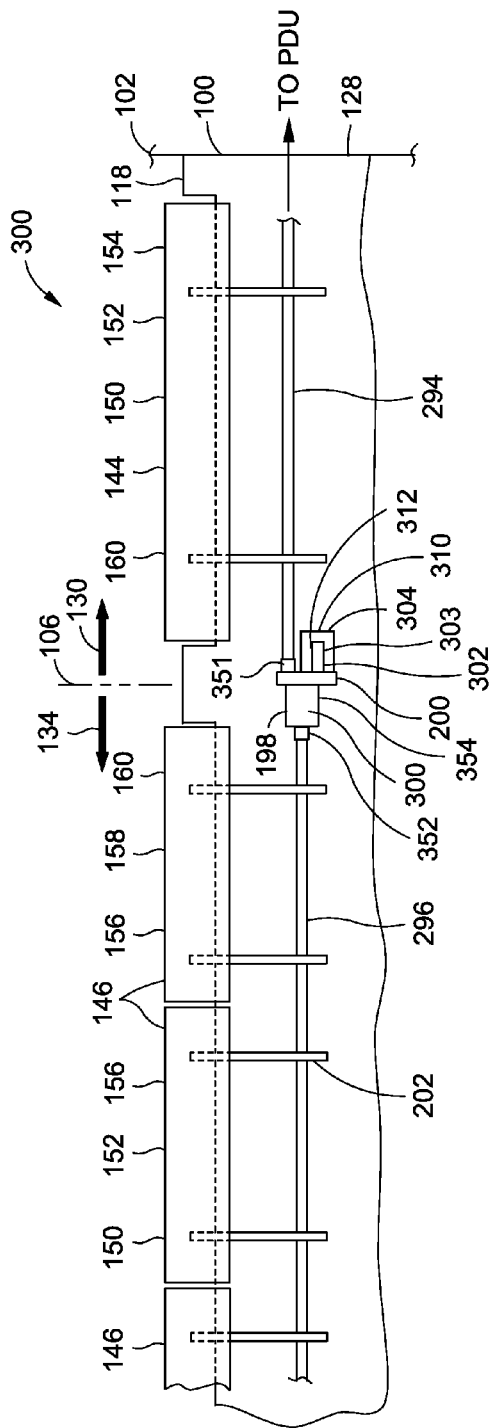

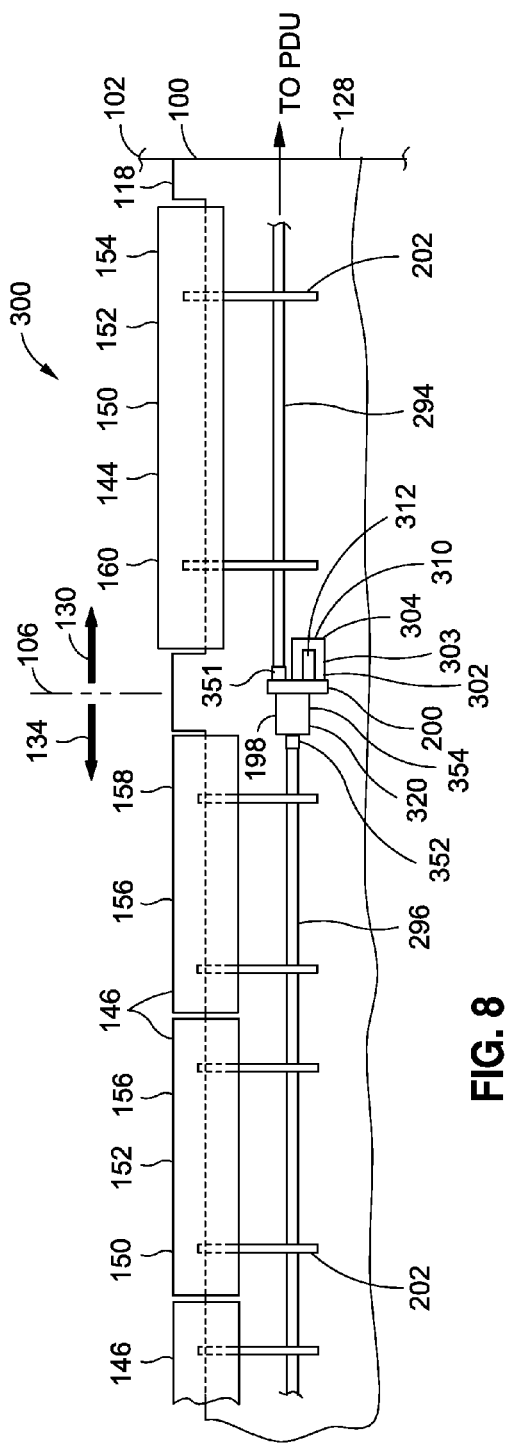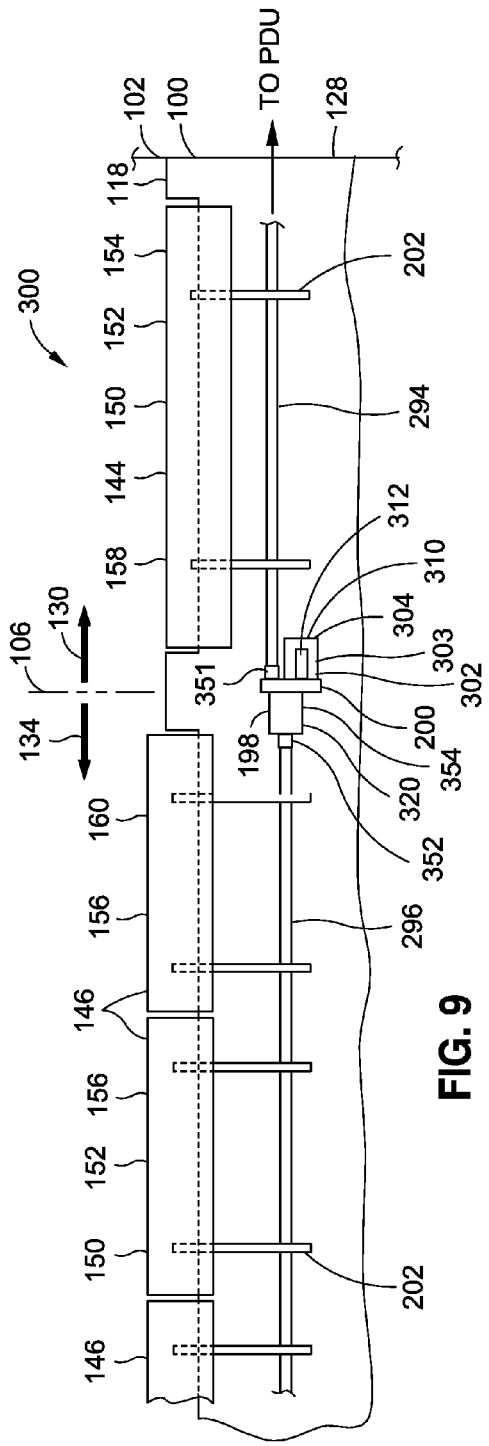

SYSTEM AND METHOD FOR REDUCING THE STOPPING DISTANCE OF AN AIRCRAFT

FIELD

The present disclosure relates generally to control surfaces of an aircraft and, more particularly, to the positioning of control surfaces of a wing during a rejected takeoff or a landing.

BACKGROUND

During takeoff of an aircraft, a pilot may need to perform a rejected takeoff maneuver for any one of a variety of different reasons. For example, as the aircraft accelerates down the runway, the pilot may receive an indication of an engine failure or a blown tire. Alternatively, a takeoff warning horn may be activated on the flight deck or instructions may be received from air traffic control to abort the takeoff.

For aircraft certification, the Federal Aviation Administration (FAA) requires that when a rejected takeoff is initiated below a takeoff decision speed, the aircraft must be capable of safely stopping before the end of the runway. Upon initiation of a rejected takeoff, the pilot and other flight crew members may reconfigure the aircraft from an initial configuration to a stopping configuration. For example, engine thrust may be reduced to idle and speedbrakes (e.g., spoilers) may be deployed to generate aerodynamic drag to reduce the stopping distance.

Certain aircraft may include an autobrake system which may automatically apply maximum braking force to the aircraft wheel brakes upon the initiation of a rejected takeoff. The autobrake system may reduce the number of tasks required by the flight crew to reconfigure the aircraft into the stopping configuration which may further reduce the stopping distance. Although an autobrake system may reduce the stopping distance, aircraft initiating a rejected takeoff near the takeoff decision speed may require increased stopping capability to maximize the performance of the aircraft.

As can be seen, there may be a need in the art for systems and methods, which may improve the stopping performance of an aircraft.

SUMMARY

The present disclosure describes a system, also referred to herein as an autoslat system, for reducing a stopping distance of an aircraft, for example during a rejected takeoff or a landing. The autoslat system may include an edge control system configured to control a leading edge device mounted to a wing of an aircraft. The autoslat system may include a speedbrake control system operable to deploy a spoiler mounted to the wing. The edge control system may be configured to automatically command extension of the leading edge device from a first position to a second position in response to deployment of a spoiler if a ground speed of the aircraft is greater than a threshold ground speed.

In a further embodiment, disclosed is an autoslat system including an edge control system having a device actuation system configured to position a leading edge device mounted to a wing of an aircraft. The autoslat system may include a thrust control system having a forward thrust lever positionable in one of an idle position and a non-idle position. The autoslat system may also include a speedbrake control system automatically commanding a spoiler actuation system to deploy a spoiler when the forward thrust lever is moved from the non-idle position to the idle position and the aircraft is on the ground and moving in excess of a threshold ground speed. The edge control system may automatically command the device actuation system to extend the leading edge device when the spoiler is automatically deployed by the spoiler actuation system in response to the forward thrust lever being moved to the idle position.

Also disclosed is a method of reducing the stopping distance of an aircraft such as during a rejected takeoff or during a landing. The method may include deploying a spoiler mounted on a wing of the aircraft. If a ground speed of the aircraft exceeds a threshold ground speed, the method may include automatically commanding a leading edge device on the wing of the aircraft from a first position to a second position in response to deployment of the spoiler.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 2 is a diagrammatic view of an aircraft during a rejected takeoff or landing;

FIG. 3 is a sectional view of a wing showing a slat in a sealed position;

FIG. 4 is a sectional view of a wing showing the slat in a gapped position;

FIG. 6 is a diagrammatic plan view of a leading edge of a wing illustrating a variable camber trim unit (VCTU) positioned between an inboard slat and an outboard slat;

FIG. 7 is a diagrammatic plan view of the leading edge of the wing of FIG. 6 illustrating the inboard slat and the outboard slat actuated in unison;

FIG. 8 is a diagrammatic plan view of the leading edge of the wing of FIG. 6 illustrating the inboard slat actuated independently of the outboard slat;

FIG. 9 is a diagrammatic plan view of the leading edge of the wing of FIG. 6 illustrating the outboard slat actuated independently of the inboard slat;

DETAILED DESCRIPTION

Figure 1:
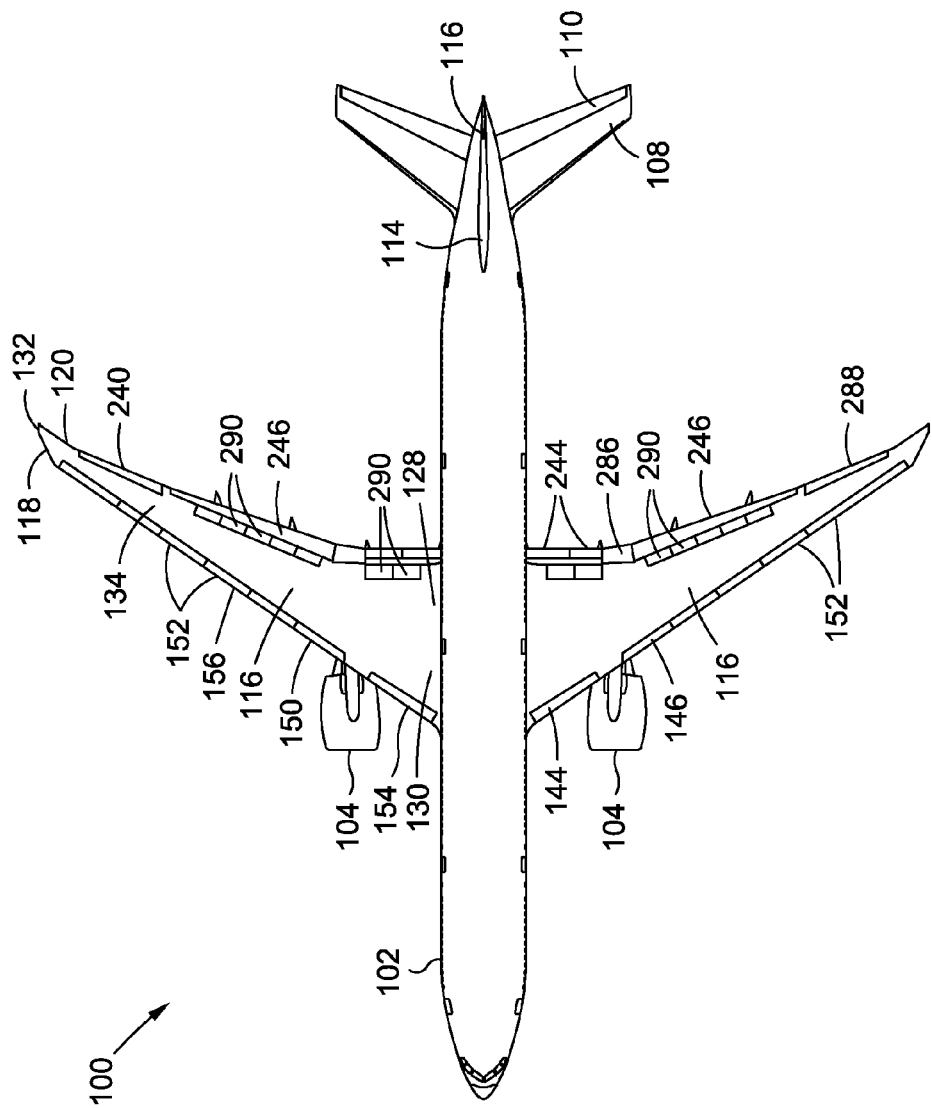
FIG. 1 is a top view of an aircraft.

Referring now to the drawings wherein the showings are for purposes of illustrating preferred and various embodiments of the disclosure, shown in FIG. 1 is a top view of an aircraft 100 having a fuselage 102 and a pair of wings 116. Each wing 116 may be attached to the fuselage 102 at a wing root 128 and may extend from an inboard portion 130 toward an outboard portion 134 and terminating at a wing tip 132. The aircraft 100 may include one or more propulsion units 104 which may be mounted to the wings 116. The aircraft 100 may further include an empennage including a horizontal tail 108 and an elevator 110, and a vertical tail 112 and a rudder 114.

As shown in the example in FIG. 1, the aircraft 100 may include one or more leading edge devices 150 and one or more trailing edge devices 240 which may be extended and retracted to alter the lift characteristics of the wings 116. For example, the aircraft 100 may include leading edge devices 150 configured as slats 152 mounted to the leading edge of the wings 116. However, the leading edge devices 150 may be provided in alternative configurations such as Krueger flaps or other device configurations, and are not limited to slats 152. The leading edge devices 150 may include one or more inboard leading edge devices 144 and one or more outboard leading edge devices 146 such as inboard slats 154 and outboard slats 156.

The aircraft 100 may include an autoslat system 300 for reducing the stopping distance of an aircraft 100. In an embodiment, the autoslat system 300 may include an edge control system 452 configured to control a leading edge device 150 mounted to a wing of an aircraft. The edge control system 452 may be configured to automatically command extension of one or more leading edge devices 150 from an initial or first position to a second position in response to deployment of a spoiler 290 if a ground speed of the aircraft 100 is greater than a threshold ground speed 564. The second position of the leading edge device 150 may be a more deployed position than the first position, which may reduce the stopping distance 586 (see e.g., FIG. 2) of the aircraft 100 such as during a rejected takeoff or during a landing, as described in greater detail below.

The wings 116 may include trailing edge devices 240 such as flaps 242 or other trailing edge device 240 configurations, as shown in the example in FIG. 1. Similar to the leading edge devices 150, the trailing edge devices 240 may include inboard devices and outboard devices. For example, the inboard devices may include one or more inboard flaps 244, and an inboard roll-control flap device configured as a flaperon 286 (e.g., a combination flap-aileron). The outboard devices may include one or more outboard flaps 246 and an outboard roll-control flap device such as an aileron 288. However, the trailing edge devices 240 may be provided in other configurations including, but not limited to, elevons and other trailing edge device configurations. The aircraft 100 may also include one or more spoilers 290 on each wing 116, which may be used for generating aerodynamic drag and/or reducing wing lift.

Referring to FIG. 2, shown is a diagrammatic view of an aircraft 100 moving down a runway 580 such as during a takeoff roll or after landing. For example, during a takeoff roll, the pilot may abort the takeoff by initiating a rejected takeoff maneuver upon the occurrence of a situation, a condition, or an event as the aircraft 100 accelerates down the runway 580. For example, a rejected takeoff maneuver may be initiated in the event of an engine failure, a blown tire, activation of a takeoff warning horn, instructions from air traffic control, or any one of a variety of other events that may occur during a takeoff roll. A rejected takeoff maneuver may be initiated prior to the aircraft 100 reaching a takeoff decision speed $V_1$ which may be described as a minimum speed, following an engine failure, at which a takeoff may be performed with only the remaining engines providing thrust. At speeds below the takeoff decision speed $V_1$, the takeoff may be aborted by performing a rejected takeoff maneuver.

After initiation of a rejected takeoff, the flight crew may reconfigure the aircraft 100 from an initial configuration 572 (e.g., a takeoff configuration) to a stopping configuration 574 so that the aircraft 100 may stop within a stopping distance 586. The aircraft 100 may travel a certain distance (e.g., distance 584) during the time period during which the flight crew is reconfiguring the aircraft 100 from the initial configuration 572 to the stopping configuration 574. The distance 584 may be described as a transition distance 584. In some instances, it may be desirable to minimize the transition distance 584, which may minimize the stopping distance 586.

Referring to FIG. 3, shown is a sectional view of a wing 116 of an aircraft 100 in the initial configuration 572 (e.g., takeoff configuration) during a takeoff roll. In the initial configuration 572, the leading edge devices 150 may be placed in the initial configuration 572 by moving the leading edge devices 150 from a retracted position 158 (shown in phantom lines) to a deployed position 160 (shown in solid lines). For example, the leading edge devices 150 may comprise slats 152 which may be moved from the retracted position 158 to a partially extended and sealed position 182 during preparation for takeoff In the sealed position 182, a portion (e.g., an aft edge) of the slats 152 may remain in contact with the wing upper surface 122. However, when the aircraft 100 is in the takeoff configuration, one or more of the leading edge devices 150 may be maintained in a retracted position 158 or a partially-deployed position (not shown) which may or may not be sealed with the wing upper surface 122. In addition, one or more of the leading edge devices 150 may be moved from the retracted position 158 to a partially-gapped position (not shown). In the initial configuration 572 for a takeoff, the spoilers 290 may be maintained in a retracted position 291 relative to a wing upper surface 122. In addition, the trailing edge devices 240 such as the flaps 242 may also be moved to a takeoff flaps setting 252.

During preparation for a landing (not shown), the initial configuration 572 of the aircraft 100 may comprise a landing configuration (not shown). In the landing configuration, one or more leading edge devices 150 may be placed in a sealed position 182 (FIG. 3), a partially-gapped position (not shown), or a gapped position 184 (FIG. 4). However, in the landing configuration, it is contemplated that one or more leading edge devices 150 may be retained in a retracted position 158 (FIG. 3). In addition, in the landing configuration, a portion of the spoilers 290 (e.g., ground spoilers) may be maintained in a retracted position 291 (FIG. 3) prior to touchdown of the aircraft 100, and a portion of the spoilers 290 (e.g., flight spoilers) may be deployed (FIG. 4) to reduce wing lift and increase aerodynamic drag during approach in preparation for landing.

In FIG. 3, when the aircraft 100 is configured for takeoff, the trailing edge devices 240 such as the flaps 242 may be moved to a takeoff flaps setting 252. Trailing edge devices 240 such as ailerons 288 (FIG. 1) and/or flaperons 286 (FIG. 1) may be maintained in a retracted position 248 when the aircraft 100 is in the initial configuration 572 (e.g., takeoff configuration). Configuring the aircraft 100 into the takeoff configuration may also include adjustment of the thrust setting of the engine control device 453 (FIG. 5) and/or engagement of an autothrottle (not shown). In an embodiment, the takeoff roll may be initiated by moving the forward thrust levers 534 (FIG. 5) from the idle position 538 to a takeoff thrust position (not shown) and by releasing the wheel brakes (not shown). The forward thrust levers 534 may be manually moved to a takeoff thrust position and/or the forward thrust levers 534 may be moved to the takeoff thrust position via the autothrottle such that the propulsion units 104 (FIG. 1) generate the required thrust for accelerating the aircraft 100 down the runway 580. Configuring the aircraft 100 in a landing configuration for landing may include positioning the flaps 242 in a landing flaps setting 254 (FIG. 4) or other shallower flap setting, reducing engine thrust, extending the landing gear 106 (FIG. 2), arming the speedbrakes, and arming the autobrake, if included with the aircraft 100.

In FIG. 3, the leading edge devices 150 and trailing edge devices 240 may be actuated using one or more device actuation systems 198. For example, the slats 152 may be actuated by a slat actuation system 200. The slats 152 may be coupled to an inboard torque tube 294 or an outboard torque tube 296 or other mechanical linkage. In an embodiment, the inboard torque tube 294 on the leading edge 118 may be coupled to a centrally-located, leading edge power drive unit (PDU) 402 (FIG. 10) as described below. Each slat 152 may be supported by one or more carrier track assemblies 202. Each carrier track assembly 202 may include one or more arcuate guide tracks 204 which may be supported by one or more guide rollers 206 mounted to the wing 116 structure. A pinion gear 208 may be mounted on the torque tube 294, 296 for engaging gear teeth (not shown) of the guide track 204.

In FIG. 3, extension and retraction of the slats 152 may be effectuated by rotating the torque tubes 294, 296 and pinion gear 208 using the PDU 402. In an embodiment, the leading edge devices 150 such as slats 152 may also be actuated by a variable camber trim unit (VCTU) 302 (FIG. 10) operating in conjunction with the PDU 402. As described in greater detail below, a VCTU 302 may be positioned between an inboard slat 154 and an outboard slat 156 on each wing 116, and may allow for actuation of the inboard and outboard slats 154, 156 independent of one another which may advantageously reduce actuation power requirements and/or hydraulic demand at the PDU 402 during a rejected takeoff or a landing.

In FIG. 3, actuation of the trailing edge devices 240 such as the flaps 242 may be effectuated by a flap actuation system 280 which may be operated in a manner similar to the above described slat actuation system 200. In this regard, the flap 242 may be actuated using a trailing edge linkage assembly 282 that may be coupled to a torque tube 294, 296. The flap 242 actuation system 280 may include a trailing edge PDU 404 (FIG. 10) which may operate in conjunction with a VCTU 302 that may be positioned between an inboard flap 244 and an outboard flap 246 on each wing 116. The deployment and retraction of the flaps 242 may be effected by rotating the torque tubes 294, 296 using the PDU 404 and/or the VCTUs 302. Although the trailing edge device 240 in FIG. 3 is shown as a simple flap 242 supported on a drop hinge 284, the flaps 242 may be provided in any one of a variety of different trailing edge device configurations including, but not limited to, a plain flap, a single-slotted flap, a multi-slotted Fowler flap, or any one of a variety of other flap configurations.

In FIG. 3, the wing 116 may also include trailing edge devices 240 such as ailerons 288 (FIG. 1) and flaperons 286 (FIG. 1) that be actuated during a rejected takeoff or a landing. The ailerons 288 (FIG. 1) and flaperons 286 may each be actuated by dedicated actuation systems (not shown). The wing 116 may further include spoilers 290 mounted on the wing upper surface 122. As indicated above, one or more of the spoilers 290 may be operated as speed brakes for generating aerodynamic drag and/or reducing aerodynamic lift of the wings 116 during a rejected takeoff or a landing.

Referring to FIG. 4, shown is a cross section of the wing 116 illustrating the slat 152 extended to the gapped position 184. Although the present disclosure describes the autoslat system 300 in the context of extending a slat 152 from a sealed position 182 to a gapped position 184 during a rejected takeoff or a landing, the autoslat system 300 encompasses the extension of any type of leading edge device 150, without limitation, from any initial position to a more deployed or further deployed position. In this regard, the autoslat system 300 encompasses the further deployment of one or more leading edge devices 150 from an initial position such as fully-retracted, stowed, partially-deployed, sealed, or partially-gapped position, to a more deployed position such as a further-deployed sealed position or to a gapped position from an initial partially-gapped position to a further deployed partially-gapped position or fully-gapped position. The extension of one or more leading edge devices 150 may be performed as part of the process of reconfiguring an aircraft 100 into a stopping configuration 574 during a rejected takeoff or during a landing, as described below.

In FIG. 4, shown is a slat 152 extended to a gapped position 184 where the slat 152 may be positioned further downwardly and forward of the wing leading edge 118 relative to the sealed position 182 (FIG. 3). Deployment of the slats 152 to the gapped position 184 results in the formation of a gap 180 between the upper aft edge of the slat 152 and the fixed leading edge of the wing 116. In the gapped position 184, the slats 152 generate increased aerodynamic drag due to exposure of a larger amount of frontal area of the slats 152 to the oncoming airflow. In addition, turbulent airflow over the exposed edges of the slats 152 and turbulent airflow through the gap 180 may generate increased aerodynamic drag relative to the amount of drag generated by the slats 152 in the sealed position 182. Furthermore, in the gapped position 184, the slats 152 may alter the wing camber which may reduce the amount of aerodynamic lift generated by the wings 116 by altering the sectional lift characteristics of the wing airfoil sections.

In FIG. 4, reconfiguring the aircraft 100 into the stopping configuration 574 may also include deployment of one or more of the spoilers 290 to a maximum deflection angle 293 such that increased aerodynamic drag is generated. The stopping configuration 574 may include deployment of all of the spoilers 290 on each wing 116 to the maximum deflection angle 293 including all of the ground spoilers and flight spoilers. Deployment of the spoilers 290 to the maximum deflection angle 293 may also reduce aerodynamic lift generated by the wings 116 allowing more of the aircraft weight to be transferred from the wings 116 to the landing gear 106 which may improve braking performance and decrease the stopping distance 586 (FIG. 2) of the aircraft 100. During a rejected takeoff or during a landing, the trailing edge devices 240 such as flaps 242, ailerons 288, and/or flaperons 286 may also be fully extended to the maximum deflection angle 256 to generate maximum aerodynamic drag to further reduce the stopping distance 586 (FIG. 2).

Referring briefly to FIG. 2, the process of reconfiguring the aircraft 100 into the stopping configuration 574 during a rejected takeoff or landing may also include moving the forward thrust levers 534 (FIG. 5) to an idle position 538 (FIG. 5) and disengaging an autothrottle (not shown) if included with the aircraft 100. The aircraft 100 may also include an autobrake system (not shown) which may be automatically engaged when the forward throttle levers are moved to the idle position 538, for example during a rejected takeoff or landing. An autobrake system may be configured to automatically apply a maximum braking force to the wheel brakes of the aircraft 100 which may reduce the stopping distance 586 (FIG. 2). An autobrake system may eliminate the need for the flight crew to manually apply the wheel brakes which may reduce the number of tasks that must be performed by the flight crew to reconfigure the aircraft 100 from the initial configuration 572 into the stopping configuration 574. By eliminating the task of manual braking, the transition distance 584 may be shortened which may further reduce the stopping distance 586 (FIG. 2) during a rejected takeoff or landing.

Figure 5:
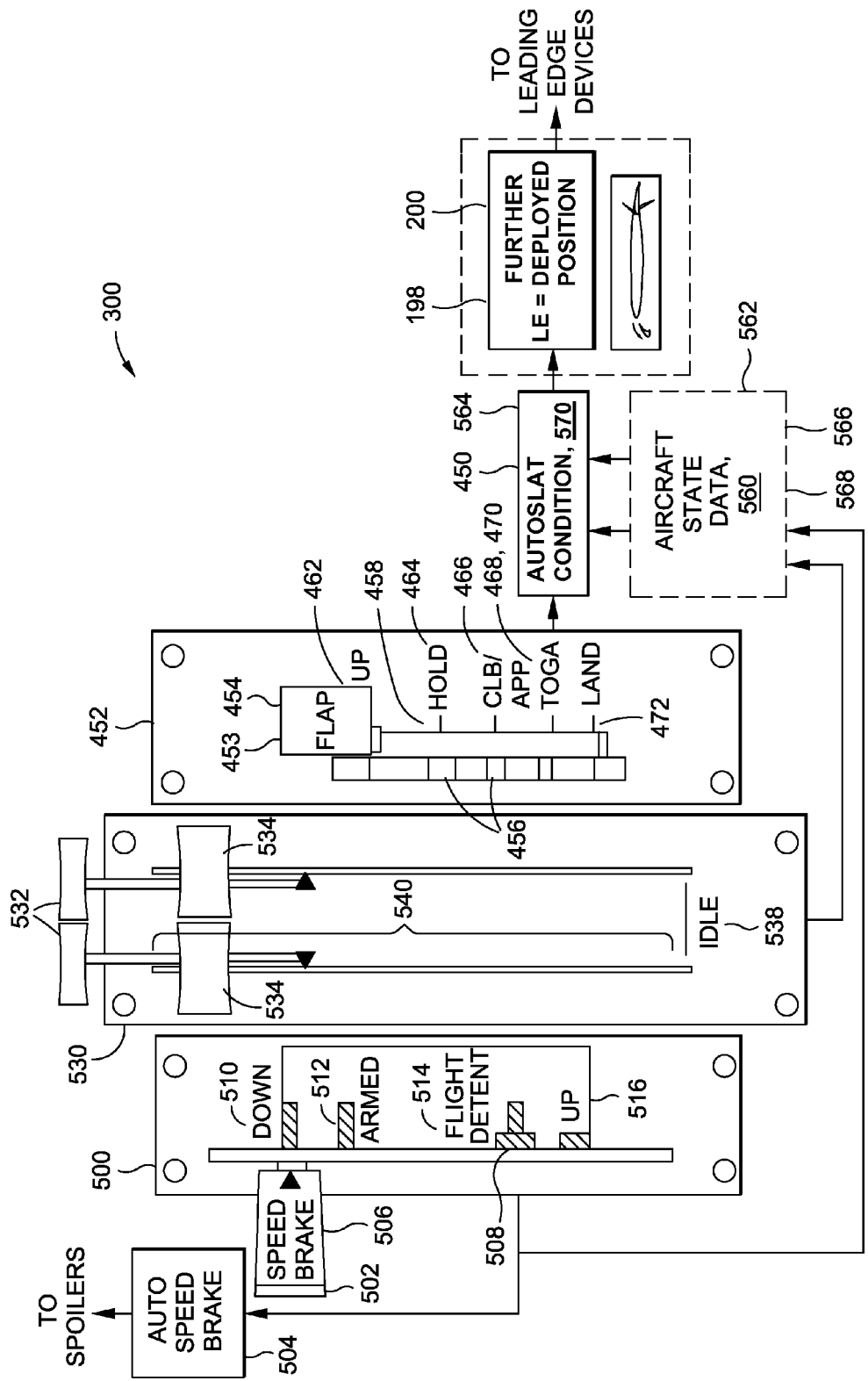
FIG. 5 is a diagrammatic view of an embodiment of an autoslat system for automatically extending a leading edge device to a gapped position during a rejected takeoff or landing.

Referring to FIG. 5, shown is a diagrammatic view of an embodiment of an autoslat system 300 configured to automatically deploy a leading edge device 150 from an initial or first position, such as a retracted position (e.g., as shown in FIG. 3), a sealed position (e.g., as shown in FIG. 4), or a partially-gapped position (not shown) or gapped position, to second position, which may be a further deployed position such as a further-deployed sealed position, a partially-gapped position, or a fully-gapped position 184. In one example, if the first or initial position is a retracted position, the second position may be virtually any position in which the leading edge device 150 is more deployed than in the initial position. For example, the second position may be any sealed position, any partially-gapped position, or a fully-gapped position 184. In some examples, if the first or initial position is a partially deployed position, for example a sealed position, the second position may be virtually any position in which the leading edge device 150 is more deployed than in the initial position, such as a further deployed sealed position, or a partially or fully-gapped position. The edge control system may be further configured to automatically command deployment of a trailing edge device 240 responsive, at least in part, to deployment of the spoiler 290 in conjunction with deployment of the leading edge device 150.

As described herein, further deployment of the leading edge devices 150 may generate increased aerodynamic drag and may reduce aerodynamic lift of the wings 116 which may improve the braking performance of the aircraft 100. In an embodiment, the autoslat system 300 may include an edge control system 452 for controlling the leading edge devices 150 and the trailing edge devices 240 mounted to the wings 116. The autoslat system 300 may further include a thrust control system 530 for controlling a thrust setting of the one or more propulsion units 104, and a speedbrake control system 500 for controlling the spoilers 290. The thrust control system may be operable for selecting an idle thrust setting and a non-idle thrust setting. The speedbrake control system 530 may be configured to automatically command deployment of the spoiler 290 responsive, at least in part, to selection of the idle thrust setting. The thrust control system may include a forward thrust lever 534 positionable in at least an idle position 538 corresponding to the idle thrust setting and a non-idle position 540 corresponding to a thrust setting different than the idle thrust setting. The speedbrake control system 530 may be configured to automatically command deployment of the spoiler 290 responsive, at least in part, to movement of the forward thrust lever 534 from the non-idle position 540 to the idle position 538.

In FIG. 5, the autoslat system 300 may additionally include a flight control computer 450 which may be communicatively coupled to the edge control system 452, the thrust control system 530, and the speedbrake control system 500. Any one of the edge control system 452, the thrust control system 530, the speedbrake control system 500, and/or the flight control computer 450 may be mounted on a control stand (not shown) on a flight deck of the aircraft 100. In an embodiment, the flight control computer 450 may be integrated into the edge control system 452, the thrust control system 530, and/or the speedbrake control system 500. In a further embodiment, the edge control system 452, the thrust control system 530, the speedbrake control system 500, and/or the flight control computer 450 may be integrated into a flight control system (not shown) of the aircraft 100.

The flight control computer 450 may be configured to detect the occurrence of an autoslat condition 570, for example during a rejected takeoff or during a landing to cause automatic deployment of the one or more leading edge devices 150 from an initial position to a further deployed position. For example, in an embodiment, the flight control computer 450 may determine that an autoslat condition 570 exists when the flight control computer 450 receives an indication that the aircraft 100 is on the ground (i.e., the runway 580) and is moving in excess of a predetermined threshold ground speed 564 during a takeoff roll or landing, the forward thrust levers 534 have been moved from a non-idle position 540 to the idle position 538, and the spoilers 290 have been deployed (FIG. 4). As described in greater detail below, spoiler 290 deployment may occur as a result of manual positioning of a speedbrake control device 502 (e.g., a speedbrake lever 506) into an UP detent by the pilot or flight crew, or the spoilers 290 may be automatically deployed by a speedbrake control system 500 (e.g., an auto speed brake system—not shown) in response to the pilot moving the forward thrust levers 534 from a non-idle position 540 to the idle position 538. Spoilers 290 may also be automatically deployed during a landing when the speedbrake lever 506 is in the armed detent 512 and/or an airplane-on-ground 566 indication is received at the flight control computer 450 indicating that the landing gear 106 is supporting at least a portion of the aircraft 100 weight.

In FIG. 5, the edge control system 452 may include the edge control device 453 which may be movable into any one of a plurality of control device positions 458 corresponding to leading edge device 150 (e.g., see FIGS. 3-4) settings and trailing edge device 240 settings (e.g., see FIGS. 3-4). The edge control system 452 may include a device actuation system 198 which may be configured to position one or more of the leading edge devices 150 and trailing edge devices 240. The device actuation system 198 may be configured to extend and retract the leading edge devices 150 and/or trailing edge devices 240 based on commands issued by the edge control system 452. In an embodiment, the device actuation system may be configured to deploy a trailing edge device 240 to a maximum deflection angle responsive, at least in part, to deployment of the spoiler 290 in conjunction with deployment of a leading edge device 150.

In FIG. 5, the edge control device 453 may be configured as a flap control lever 454 that may be movable along a forward-and-aft direction. The flap control lever 454 may be positionable at one or more control device positions 458 or flap control lever positions, although the edge control device 453 may be provided in alternative embodiments. The edge control device 453 may include one or more mechanical gates 456 to prevent inadvertent retraction of the leading edge devices 150 and/or the trailing edge devices 240 by requiring manual manipulation the edge control device 453 to move the edge control device 453 past the gate 456. In the embodiment shown, the control device positions 458 may include a cruise position 462 designated as UP, a hold position 464 designated as HOLD, a climb position or approach position 466 designated as CLB/APP, a takeoff position 468 or go-around position 470 designated as TOGA, and a landing position 472 designated as LAND. The control device positions 458 may be designated by different nomenclature and are not limited to the designations shown in FIG. 6. For example, the control device positions 458 may include UP, F1, F5, F20, and F30, or the control device positions 458 may include 0, 1, 2, 3/OPT, FULL, and which may generally correspond to the above-noted UP, HOLD, CLB/APP, TOGA, and LAND control device positions 458.

In FIG. 5, for takeoff, the flap control lever 454 may be moved to the takeoff position prior to the aircraft 100 initiating the takeoff roll down the runway 580. With the flap control lever 454 in the takeoff position, the trailing edge devices 240 such as the flaps 242 may move to a takeoff flaps setting 252 and the leading edge devices 150 such as the slats 152 may move to a takeoff slat setting such as the sealed position 182 (FIG. 4) or to a partially-gapped position. Alternatively, the takeoff slat setting for the leading edge devices 150 may comprise a stowed or retracted position 158. For landing, the flap control lever 454 may be moved to the landing position 472 or to a shallower flap position.

During the takeoff roll and during landing, the flight control computer 450 may analyze aircraft state data 560 to determine whether an autoslat condition 570 exists requiring the further deployment of one or more leading edge devices 150. During takeoff, the flight control computer may determine that an autoslat condition exits upon the occurrence of an event such as a blown tire, engine failure, warning horn, air traffic control instructions, or other events 582 triggering a rejected takeoff maneuver. During landing, the flight control computer 450 may determine that an autoslat condition 570 exits when an indication is received by the flight control computer 450 that the landing gear 106 is supporting at least a portion of the aircraft 100 weight, and the spoilers 290 are deployed. In an embodiment, the edge control system 452 may automatically command the device actuation system 198 to further deploy the leading edge devices 150 from their initial position to a further deployed position upon the occurrence of the autoslat condition 570. Upon deployment of the spoilers 290 during a rejected takeoff or a landing, the edge control system 452 may also command the device actuation system 198 to move the trailing edge devices 240 (e.g., flaps 242, ailerons 288, flaperons 286) to the maximum deflection angle 256 regardless of the position of the flap control lever 454 prior to initiation of the rejected takeoff or prior to the landing. For the flaps 242, the maximum deflection angle 256 may correspond to the landing flaps setting 254 (FIG. 4).

In FIG. 5, in an embodiment, the autoslat system 300 may include the thrust control system 530 which may include one or more forward thrust levers 534 and one or more reverse thrust levers 532. For takeoff, the forward thrust levers 534 may be advanced from an idle position 538 to a non-idle position 538 corresponding to a desired thrust setting of the propulsion units 104 (FIG. 1). The reverse thrust levers 532 may be coupled to the forward thrust levers 534 and may allow for controlling engine reverse thrust via thrust reversers (not shown) on the propulsion units 104 and which may be activated when the forward thrust levers 534 are in the idle position 538. As indicated above, the thrust control system 530 may be communicatively coupled to the flight control computer 450. The thrust control system 530 may provide an indication to the flight control computer 450 when the forward thrust levers 534 are moved by the pilot or other flight crew from a non-idle position 540 to the idle position 538 during the initiation of a rejected takeoff or during a landing.

In FIG. 5, in an embodiment, the autoslat system 300 may further include the above-mentioned speedbrake control system 500 which may be communicatively coupled to the flight control computer 450. The speedbrake control system 500 may include a speedbrake control device 502 and a spoiler actuation system 504 for deploying the spoilers 290. The speedbrake control device 502 may be configured as a speedbrake lever 506 and may have a plurality of speedbrake detents 508 which may represent a deflection angle for the spoilers 290 (FIG. 4). In the embodiment shown, the speedbrake detents 508 may include a down detent 510 designated as DOWN, an armed detent 512 designated as ARMED, a flight detent 514 designated as FLIGHT DETENT, and an up detent 516 designated as UP. However, the speedbrake control device 502 may include a larger or smaller quantity of speedbrake detents 508. In addition, the speedbrake detents 508 may be designated by different nomenclature and are not limited to the illustrated designations in FIG. 5.

As indicated above, during the initiation of a rejected takeoff or during a landing, one or more of the spoilers 290 may be deployed to a maximum deflection angle 293 in response to the pilot or other flight crew member manually moving the speedbrake control device 502 to the UP detent to cause the spoiler actuation system 504 to deploy the spoilers 290. The spoilers 290 on each wing 116 may be deployed substantially simultaneously to the maximum deflection angle 293. In a further embodiment, during a rejected takeoff or a landing, the speedbrake control system 500 may automatically command the spoiler actuation system 504 to deploy the spoilers 290 when the flight control computer 450 receives an indication that the forward thrust levers 534 have been moved from a non-idle position 540 (e.g., a takeoff thrust setting) to the idle position 538 and/or the aircraft 100 is on the ground and is moving in excess of a threshold ground speed 564.

In FIG. 5, the flight control computer 450 may receive aircraft state data 560 regarding the state of the aircraft 100 during the takeoff roll or landing. The aircraft state data 560 may include the above-mentioned airplane-on-ground 566 indication, an indication of the actual ground speed 562 of the aircraft 100, an indication of movement of the forward thrust levers 534 to the idle position 538, and an indication of the speedbrake setting 568 representing deployment of the spoilers 290. The airplane-on-ground 566 indication may be provided by one or more sensors (not shown) on the landing gear 106 (not shown) which may sense spin-up of the wheels, compression of landing gear struts, tilt of the landing gear trucks, or other parameters indicating that the landing gear 106 is supporting at least a portion of the aircraft 100 weight. One or more ground speed sensors (not shown) may transmit an indication of the aircraft 100 actual ground speed 562 to the flight control computer 450. The flight control computer 450 may compare the actual ground speed 562 to a predetermined threshold ground speed 564, and determine whether the actual ground speed 562 exceeds the threshold ground speed 564.

In FIG. 5, the thrust control system 530 may transmit to the flight control computer 450 an indication of movement of the forward thrust levers 534 from a non-idle position 540 to the idle position 538. The speedbrake control system 500 may transmit an indication to the flight control computer 450 regarding the deployment of the spoilers 290 from the retracted position 291 (FIG. 3) to the deployed position 160 (FIG. 4). The flight control computer 450 may analyze the above-noted aircraft state data 560 to determine whether the autoslat condition 570 exists. Upon determining that the autoslat condition 570 exists, the flight control computer 450 may transmit a signal to the edge control system 452 to cause the edge control system 452 to automatically command the device actuation system 198 to further deploy the leading edge devices 150 from their initial position in preparation for takeoff or their initial position in preparation for landing.

In an embodiment, the edge control system 452 may automatically command the device actuation system 198 to extend the leading edge devices 150 when the spoilers 290 are automatically deployed (i.e., using the auto speed brake) by the spoiler actuation system 504 in response to the forward thrust levers 534 being moved to the idle position 538. The further deployment of the leading edge devices 150 may advantageously alter the wing camber which may alter (e.g., reduce) the sectional lift characteristics of the wings 116 which may improve the stopping performance of the aircraft 100 and reduce the stopping distance 586 (FIG. 2). For example, depending on the aircraft 100, autogapping of the leading edge devices 150 during a rejected takeoff may provide an estimated 5,000-10,000 pounds of additional weight on the aircraft wheels which may improve braking performance and reduce takeoff field length by up to approximately 50 feet or more. Furthermore, further deployment of the leading edge devices 150 may increase aerodynamic drag. In addition, by automating the deployment of the leading edge devices 150 instead of the pilot manually deploying the leading edge device 150 using the flap control lever 454, the transition time and transition distance 584 (FIG. 2) may be minimized.

In an embodiment, the autoslat system 300 may be configured such that the edge control system 452 automatically deploys the trailing edge devices 240 upon deployment of the spoilers 290 from the retracted position 291 to the deployed position 292. Alternatively, the autoslat system 300 may be configured such that the edge control system 452 automatically deploys the trailing edge devices 240 in conjunction with the further deployment of the leading edge devices 150. Trailing edge devices 240 that may be automatically deployed may include the flaps 242, the ailerons 288, and/or the flaperons 286 (FIG. 1). For example, the flaps 242, ailerons 288, and/or flaperons 286 may be automatically deployed such as from a retracted position 248 to a maximum deflection angle 256 in a deployed position 250 upon deployment of the spoilers 290 from the retracted position 291 to the deployed position 292. Movement of the trailing edge devices 240 to the maximum deflection angle 256 may increase aerodynamic drag which may shorten the stopping distance 586 (FIG. 2) of the aircraft 100 during a rejected takeoff or a landing.

Referring to FIG. 6-9, shown are diagrammatic views of an embodiment of the autoslat system 300 allowing for further deployment of the inboard and outboard leading edge devices 144, 146 independent of one another. In this regard, the device actuation system may be configured to actuate the inboard leading edge device 144 independently of the outboard leading edge device 146, and vice versa. By initially deploying a subset of the leading edge devices 150 such as from the sealed position 182 to the gapped position 184, actuation power requirements may be reduced. For example, by initially deploying the outboard leading edge devices 146 followed by deploying the inboard leading edge devices 144 during a rejected takeoff or a landing, the total power requirements and/or hydraulic demand for actuating the leading edge devices 150 may be reduced relative to higher power requirements and greater hydraulic demand for further deploying all of leading edge devices 150 at one time. As indicated above, reduced power requirements and reduced hydraulic demand may be advantageous in the event of an engine-out situation during a rejected takeoff or landing. An engine-out situation may result in reduced availability of power for actuating the spoilers 290, the leading and trailing edge devices 150, 240, and other systems due to the inability of the non-operative engine to generate power and/or hydraulic pressure.

In FIGS. 6-9, independent actuation of the inboard and outboard leading edge devices 144, 146 may be facilitated by a variable camber trim unit (VCTU) 302 as part of the device actuation system 198. As indicated above, a VCTU 302 may be positioned between an inboard and outboard leading edge device 144, 146 to allow for independent actuation of the inboard and outboard leading edge devices 144, 146. A VCTU 302 may also be positioned between an inboard trailing edge device 240 and outboard trailing edge device 240 to allow for independent actuation of the inboard and outboard trailing edge devices 240. In this regard, the VCTU 302 may allow for further deployment of a subset of the leading edge devices 150 upon the occurrence of an autoslat condition 570 (FIG. 5). For example, upon the occurrence of an autoslat condition 570, a VCTU 302 positioned between the inboard slats 154 and the outboard slats 156 may allow for automatically moving the outboard slats 156 to a further deployed position while the inboard slats 154 are held stationary. In an embodiment, the outboard slats 156 may be automatically deployed to a gapped position 184 (FIG. 4) while the inboard slats 154 are momentarily retained in a sealed position 182 (FIG. 3). After the outboard slats 156 reach the further deployed position (e.g., the gapped position 184), the inboard slats 154 may then be automatically moved to a further deployed position (e.g., the gapped position 184). However, the VCTUs may operate in conjunction with the PDUs 400 to automatically deploy the inboard and outboard slats 154, 156 in unison.

Figure 11:
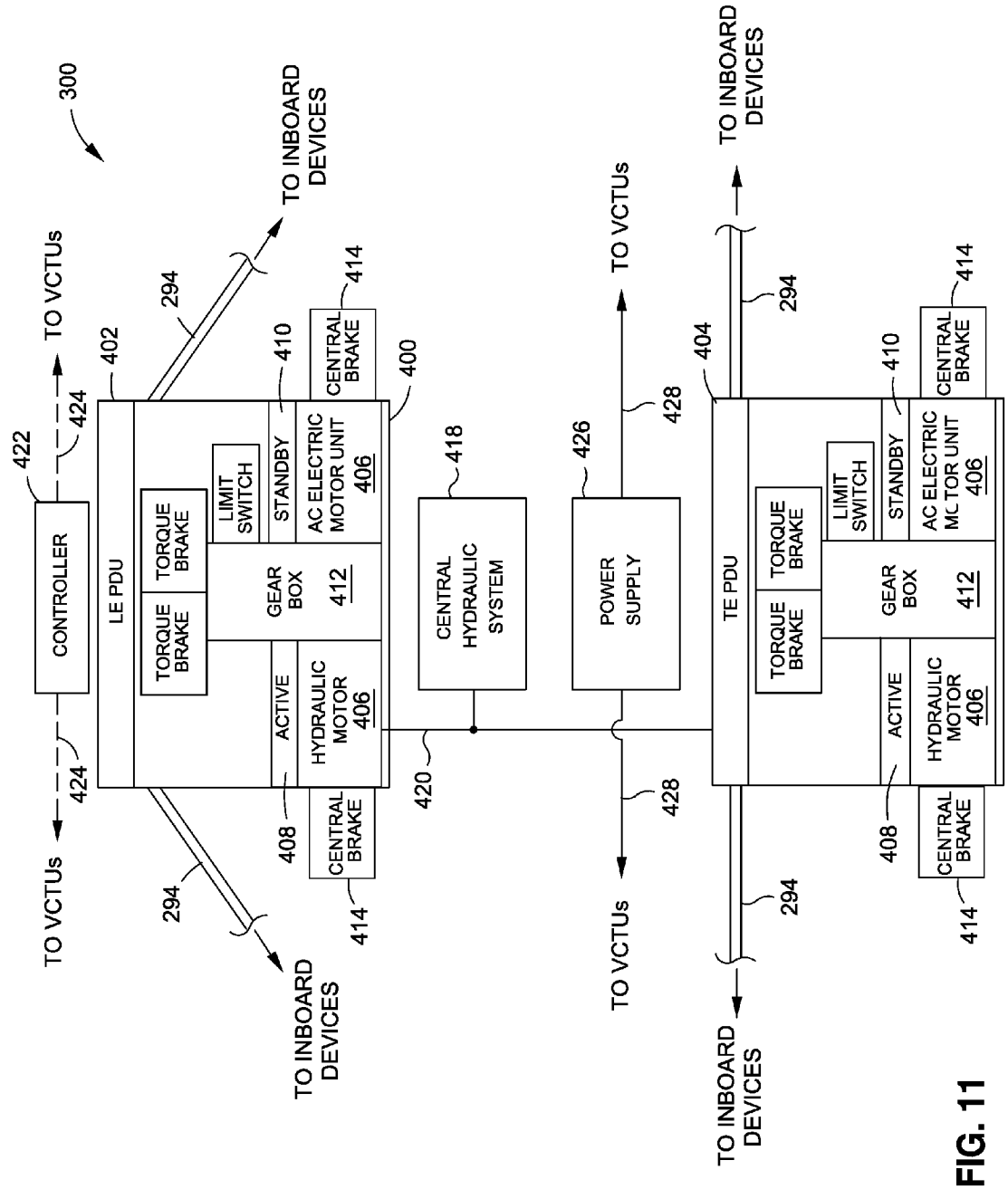
FIG. 11 is a diagrammatic view of a center portion of the wing of FIG. 10 and illustrating a leading edge power drive unit (PDU) for driving the inboard slats and a trailing edge PDU for driving the inboard flaps.

Referring more particularly to FIG. 6, shown is diagrammatic plan view of a leading edge 118 of a wing 116 schematically illustrating a VCTU 302 positioned between an inboard leading edge device 144 (e.g., an inboard slat 154) and outboard leading edge devices 146 (e.g., outboard slats 156). The inboard slats 154 may be coupled to an inboard torque tube 294 and the outboard slats 156 may be coupled to an outboard torque tube 296. The VCTU 302 may include a dedicated electric motor 304 which may be operated in conjunction with the speed sum gearbox 320 and an outboard brake 354. The inboard slat 154 may be driven by a central motor 406 (FIG. 11) of a leading edge PDU 402 (FIG. 11). As described in greater detail below, the VCTU 302 may be included with the device actuation system 198 and may be operated in conjunction with the PDU 402 to automatically deploy the inboard and outboard leading edge devices 144, 146 independent of one another.

In FIG. 7, shown is a diagrammatic view of the wing 116 leading edge 118 of FIG. 6 illustrating the operation of the VCTU 302 in conjunction with the leading edge PDU 402 to further deploy the inboard and outboard slats 154, 156 in unison from their initial position. As described below, the power-off brake 310 of the VCTU 302 may be applied to prevent rotational movement of the electric motor 304. The central motor 406 (FIG. 11) of the leading edge PDU 402 (FIG. 11) may be activated for actuating the inboard slat 154. With the power-off brake 310 applied, actuation of the inboard slat 154 by the central motor 406 of the leading edge PDU 402 may rotate the inboard torque tube 294. When the power-off brake 310 of the VCTU 302 is applied, the rotational movement of the inboard torque tube 294 may be transferred through the speed sum gearbox 320 to the outboard torque tube 296 resulting in actuation of the inboard slat 154 and the outboard slat 156 in unison.

In FIG. 8, shown is a diagrammatic view of the wing 116 leading edge 118 of FIG. 6 illustrating the further deployment of the inboard slat 154 independently of the outboard slats 156. For independent deployment of the inboard slats 154, the power-off brake 310 of the electric motor 304 may be released. The outboard brake 354 of the VCTU 302 may be applied to prevent rotation of the outboard slats 156. The central motor 406 (FIG. 11) of the leading edge PDU 402 (FIG. 11) may be activated resulting in rotation of the inboard torque tube 294. The speed sum gearbox 320 of the electric motor 304 may be configured such that rotation of the inboard torque tube 294 causes the electric motor 304 to be back-driven while the inboard slat 154 is actuated by the central motor 406 of the leading edge PDU 402.

In FIG. 9, shown is a diagrammatic view of the wing 116 leading edge 118 of FIG. 6 and illustrating the further deployment of the outboard slats 156 independently of the inboard slat 154. In an embodiment, the autoslat system 300 may be configured such that the edge control system 452 automatically commands the device actuation system 198 to extend one or more outboard leading edge devices 146 (e.g., the outboard slats 156) such as from the sealed position 182 (FIG. 4) to a further-deployed sealed position, partially-gapped position, or gapped position 184 (FIG. 5) prior to further deploying one or more inboard leading edge devices 144 (e.g., the inboard slat 154). As indicated above, by initially moving only the outboard leading edge devices 146, total power requirements for further deploying the leading edge devices 150 may be reduced as may hydraulic demand at the leading edge PDU 402.

In FIG. 9, for independent deployment of the outboard slats 156, the central motor 406 of the leading edge PDU 402 may be prevented from rotating the inboard slat 154 by applying a central brake 414 which may be coupled to the central motor 406. The outboard brake 354 of the VCTU 302 may be released. Additionally, the power-off brake 310 of the electric motor 304 may be released. The electric motor 304 may then be activated causing rotation of the outboard torque tube 296 and resulting in deployment of the outboard slats 156 independently of the inboard slat 154. In this manner, upon detection by the flight control computer 450 of an autoslat condition 570, the edge control system 452 may automatically command the VCTU motor controller 303 to activate the electric motor 304 in a manner causing the outboard slats 156 to be further extended.

In FIG. 9, after the outboard slats 156 are further extended, the outboard brake 354 of the VCTU 302 may be applied. With the power-off brake 310 of the VCTU electric motor 304 released, the central brake 414 of the leading edge PDU 402 may be released and the central motor 406 of the leading edge PDU 402 may be activated causing the inboard torque tube 294 to rotate. Rotation of the inboard torque tube 294 may cause the inboard slat 154 to be further extended while the outboard slats 156 are stationary. The VCTU electric motor 304 may be back-driven while the inboard slat 154 is further deployed.

Figure 10:
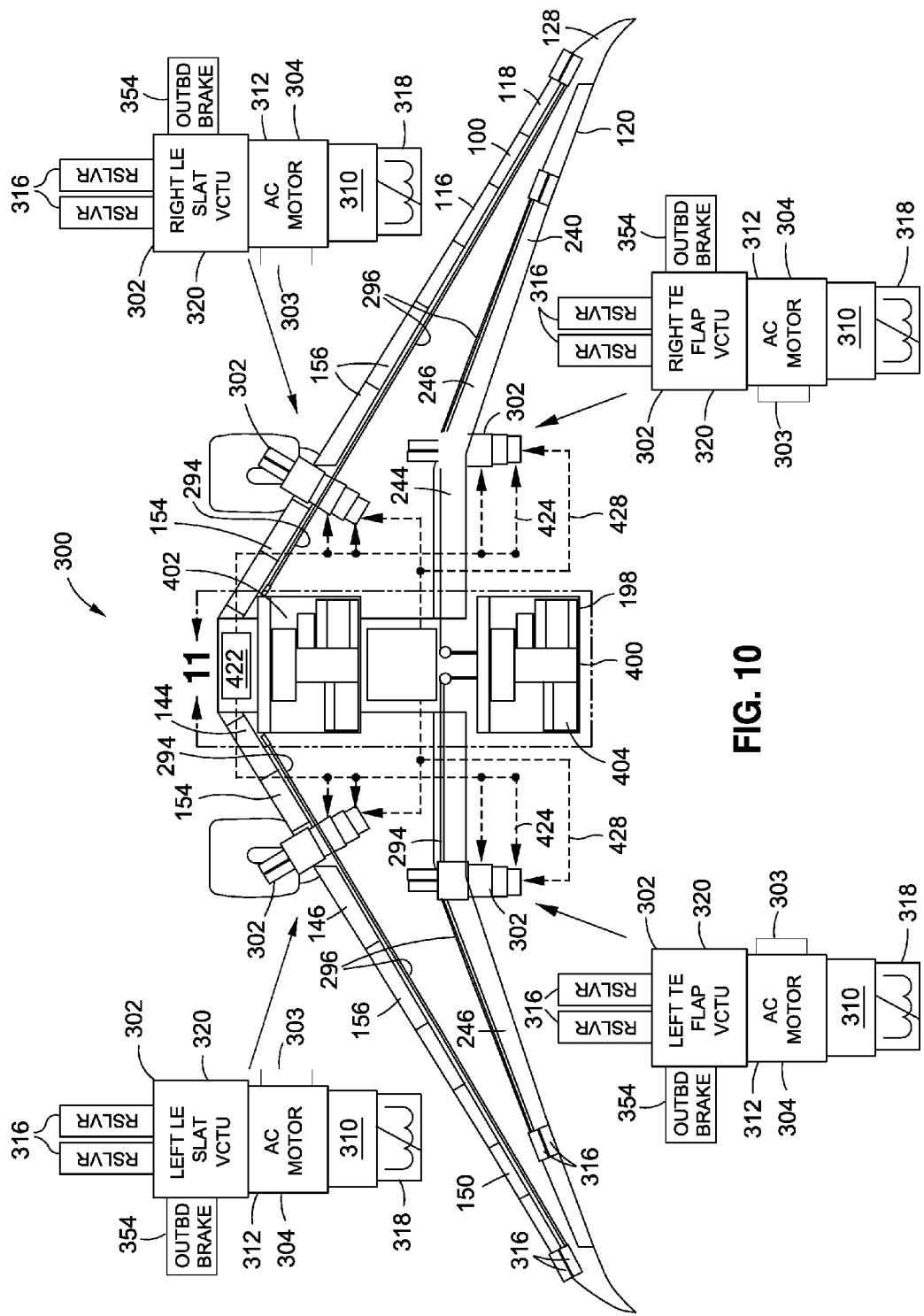
FIG. 10 is a diagrammatic view of a pair of wings incorporating a VCTU between the inboard and outboard slats and between the inboard and outboard flaps on each wing.

In FIG. 10, shown is a diagrammatic view of a device actuation system 198 incorporating VCTUs 302 between the inboard leading edge devices 144 and outboard leading edge devices 146 on the leading edge 118 of each wing 116 of the aircraft 100. A similar arrangement of VCTUs 302 may be implemented with the trailing edge devices 240. In the embodiment shown, the device actuation system 198 may include a leading edge PDU 402 coupled to the leading edge devices 150 on opposite sides of the fuselage 102, and a trailing edge PDU 404 coupled to the trailing edge devices 240 on opposite sides of the fuselage 102. The device actuation system 198 may be controlled by flight control electronics 422 which may be centrally-located on the aircraft 100 and/or may be positioned adjacent to one or both of the PDUs 400. The flight control electronics 422 may be configured to generate command signals for actuating the leading edge devices 150 and the trailing edge devices 240. The command signals may be transmitted via one or more command lines 424 or wirelessly transmitted to the leading edge PDU 402, the trailing edge PDU 404, and to the motor controller 303 of each VCTU 302.

In FIG. 10, each motor controller 303 may control the VCTU electric motor 304, the outboard brake 354, and/or the power-off brake 310 of the VCTU 302. The flight control electronics 422 may transmit command signals to the motor controller 303 of the VCTU electric motor 304 and to the central motor 406 causing actuation (e.g., deployment and retraction) of the inboard leading edge devices 144 and the outboard leading edge devices 146. The flight control electronics 422 may receive position signals from one or more position sensors 312 (see e.g., FIG. 13) that may be included with each one of the VCTUs 302. The position signals may represent the current position or deflection angle of each one of the inboard leading edge devices 144.

In FIG. 10, the device actuation system 198 may further include a central power supply 426 for powering the VCTU electric motor 304 of each one of the VCTUs 302. The power supply 426 may be centrally-located such as adjacent to the PDUs 400. In an embodiment, each VCTU electric motor 304 may include the above-mentioned motor controller 303 which may be powered by the central power supply 426 with a substantially continuous supply of relatively low-voltage power. Such low-voltage power may be removed from the motor controller 303 for certain types of faults. Relatively high-voltage power may be provided to the VCTU electric motors 304 from the central power supply 426 via an electric supply line 428 to cause the VCTU electric motor 304 to rotate such as in response to a command signal transmitted along a command line 424 from the flight control electronics 422 to the motor controller 303.

As shown in FIG. 10, each one of the VCTUs 302 may include a VCTU electric motor 304 and a speed sum gearbox 320. An outboard brake 354 may be included with each VCTU 302 to prevent rotation of the outboard device 146 as indicated above. The VCTU 302 may include the above-mentioned power-off brake 310 which may be coupled to the VCTU electric motor 304 and which may be applied by one or more coils 318. The coils 318 may receive power from the centrally-located central power supply 426 via an electric supply line 428 for activating the power-off brake 310 such as in response to a command signal received from the flight control electronics 422 via a command line 424. One or more resolvers 316 may be included at different locations on the leading edge devices 150 and/or trailing edge devices 240 for indicating the positions of such devices 150, 240 and which may be provided to the flight control electronics 422.

FIG. 11 is a diagrammatic view of a center portion of the variable camber actuation system showing the leading edge PDU 402 and the trailing edge PDU 404. As indicated earlier, the leading edge PDU 402 and the trailing edge PDU 404 may be coupled to the inboard torque tubes 294 on the respective leading edge 118 and trailing edge 120 of each wing 116. In an embodiment, each one of the PDUs 400 may include at least one central motor 406. For example, in FIG. 12, each one of the PDUs 400 may include an active motor 408 and a backup motor 410. Each one of the central motors 406 may be coupled to or may include a central brake 414 configured as a power-off brake for preventing rotation of the central motor 406 and thereby preventing actuation of the inboard device 144 to which the central motor 406 is coupled.

In FIG. 11, in an embodiment, the active motor 408 and/or the backup motor 410 may be configured as a hydraulic motor or an electrohydraulic actuator which may be coupled to a central hydraulic system 418 via one or more hydraulic lines 420. In an embodiment, the active motor 408 and/or the backup motor 410 may optionally be configured as an electromechanical actuator or an electric motor for controlling the actuation of the inboard devices. The central motors 406 of the leading edge PDU 402 may be coupled to the inboard torque tubes 294 for driving the inboard leading edge devices 144. The trailing edge PDU 404 may be coupled to the inboard devices on the trailing edge 120 in a manner similar to the leading edge PDU 402. Each one of the PDUs 400 may include a central gearbox 412 and one or more central brakes 414. Each one of the central motors 406 may be coupled to the central brake 414 (e.g., a power-off brake) which may be configured to prevent movement of the inboard devices when both central brakes 414 are applied.

Figure 12:
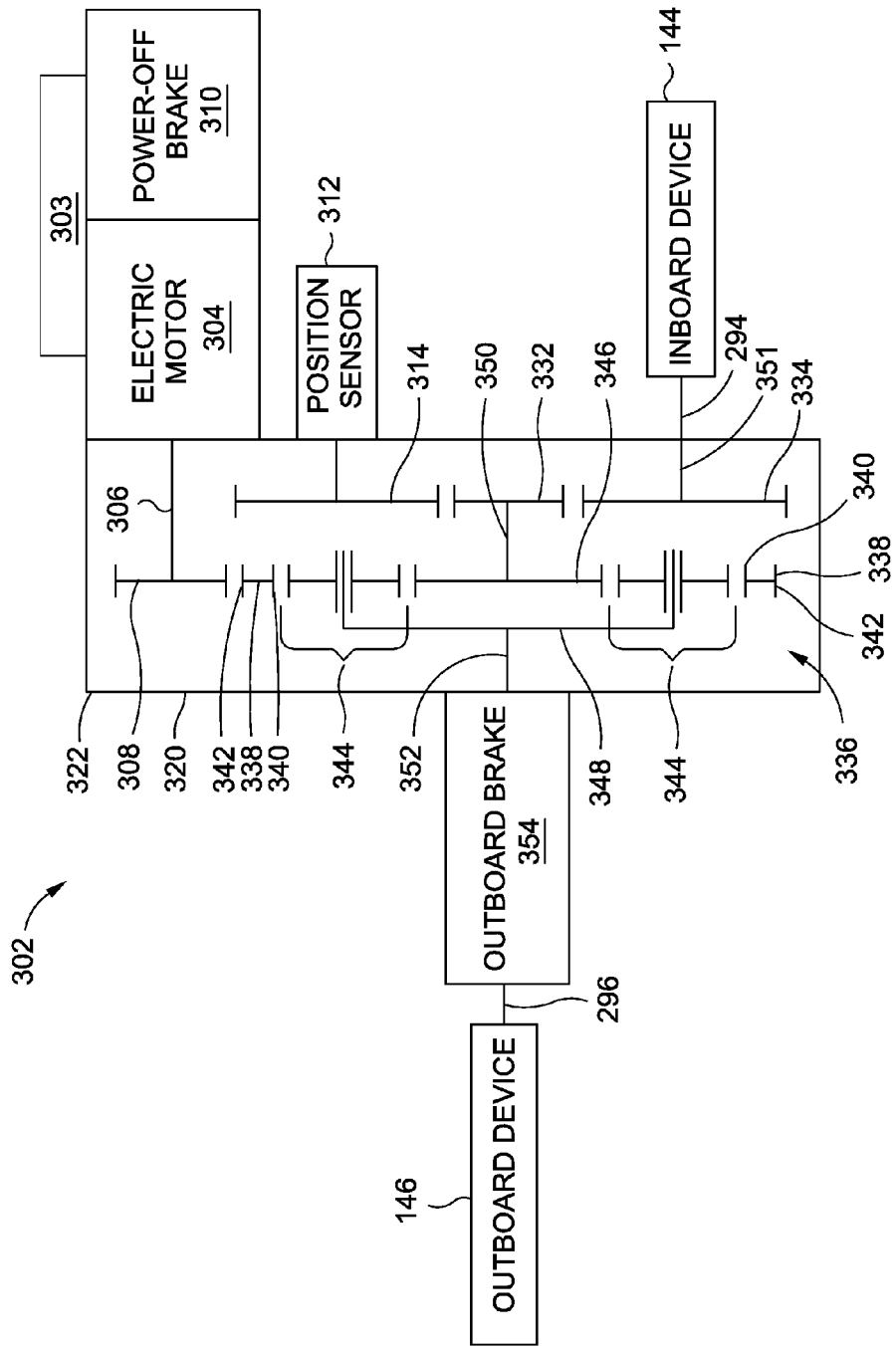
FIG. 12 is a schematic view of a VCTU including a speed sum gearbox having an outboard brake and a VCTU electric motor.

FIG. 12 is a schematic diagram of an embodiment of a VCTU 302 illustrating the interconnection of the speed sum gearbox 320 with the outboard brake 354, the VCTU electric motor 304 and power-off brake 310, and the position sensor 312. The arrangement of the VCTU 302 is described below in the context of the inboard and outboard leading edge devices 144, 146, and may be implemented in a similar manner for the trailing edge devices 240. The speed sum gearbox 320 includes an inboard shaft 351 that may be coupled to an inboard leading edge device 144 via an inboard torque tube 294, and an outboard shaft 352 that may be coupled to an outboard leading edge device 146 via an outboard torque tube 296. The VCTU electric motor 304 may include a motor shaft 306 having a motor pinion 308 that may be engaged to a ring gear 338 of the speed sum gearbox 320.

The speed sum gearbox 320 may be configured such that if one of the three shafts (i.e., the inboard shaft 351, the outboard shaft 352, the motor shaft 306) is held stationary and prevented from rotating, the remaining pair of shafts will rotate under the driving force of one of the remaining shafts of the pair. For example, if the inboard shaft 351 is prevented from rotating due to application of the central brake 414 of the PDU, then rotation of the motor shaft 306 will cause rotation of the outboard shaft 352 resulting in actuation of the outboard leading edge device 146 independent of the inboard leading edge device 144. If the motor shaft 306 is prevented from being rotated due to application of the power-off brake 310, then rotation of the inboard shaft 351 will cause rotation of the outboard shaft 352 resulting in actuation of the inboard and outboard leading edge devices 144, 146 in unison with one another. If the outboard shaft 352 is prevented from rotating due to application of the outboard brake 354, then rotation of the inboard shaft 351 by the central motor 406 will cause the VCTU electric motor 304 to be back-driven while the inboard leading edge device 144 is actuated and the outboard leading edge device 146 is stationary.

In FIG. 12, the inboard shaft 351 may be fixedly (e.g., non-rotatably) coupled to the inboard device 144 via the inboard torque tube 294. The outboard shaft 352 may be fixedly (e.g., non-rotatably) coupled to the outboard device 146 via the outboard torque tube 296. The inboard shaft 351 may include an inboard pinion 334 that may be coupled to an inboard gear 332 of the speed sum gearbox 320. The inboard gear 332 may be mounted on or fixedly (i.e., non-rotatably) coupled to a sun gear shaft 350 of a sun gear 346 of the speed sum gearbox 320. The position sensor 312 may include a position sensor gear 314 that may be engaged to the inboard gear 332 for sensing a position of the inboard leading edge device 144 and transmitting a position signal to the flight control electronics 422. The speed sum gearbox 320 may include a plurality of planet gears 344 that may be supported on a carrier 348. The carrier 348 may be fixedly (i.e., non-rotatably) coupled to or mounted on the outboard shaft 352. The planet gears 344 may encircle and may be engaged to the sun gear 346. The plurality of planet gears 344 may be circumscribed by a ring gear 338. The motor pinion 308 may be engaged to an external side 342 of the ring gear 338.

Figure 13:
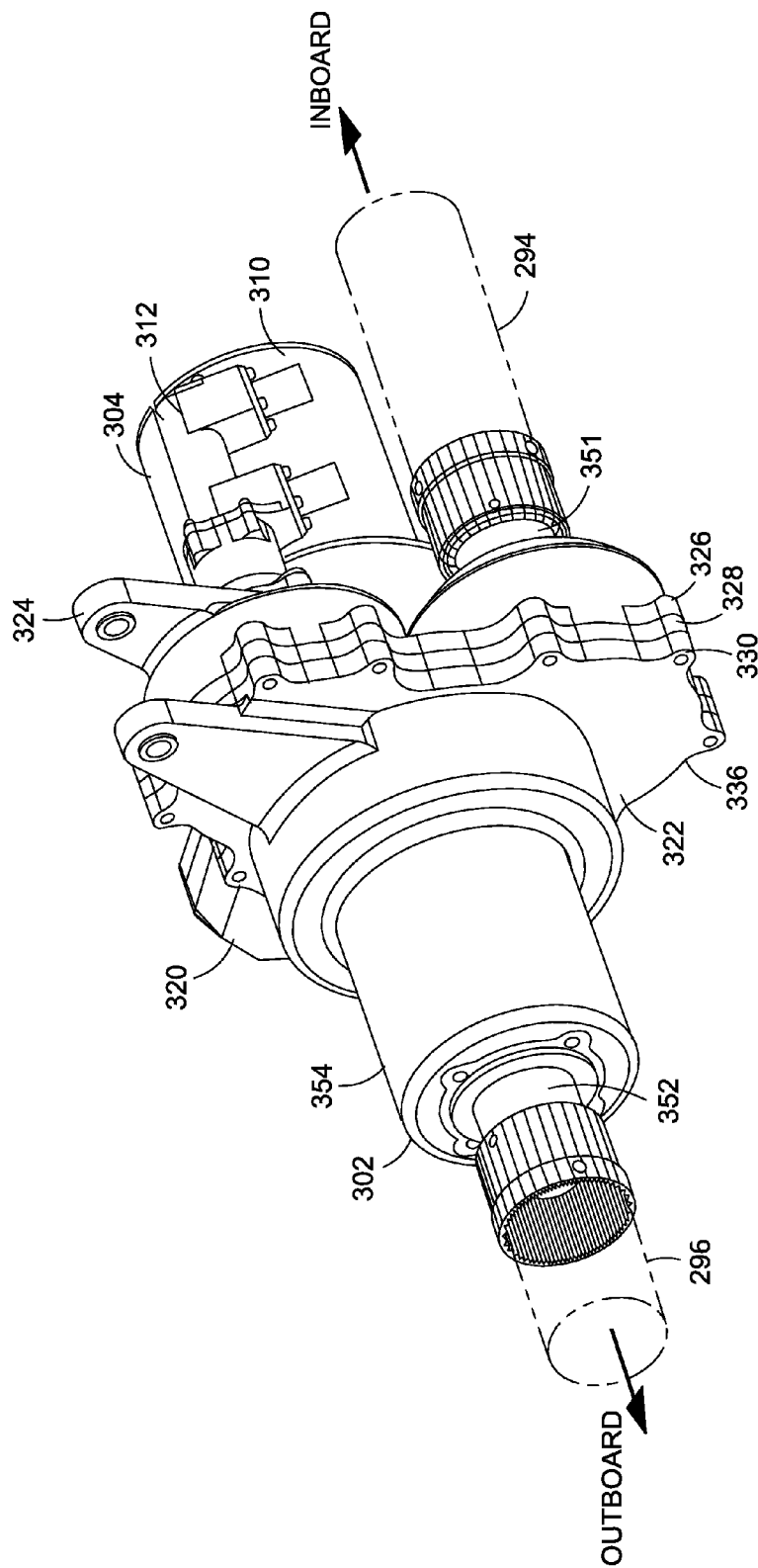
FIG. 13 is a perspective illustration of an embodiment of a VCTU.

FIG. 13 is a perspective illustration of an embodiment of the VCTU 302 and showing the inboard torque tube 294 coupled to the inboard shaft 351 and the outboard torque tube 296 coupled to the outboard shaft 352 of the speed sum gearbox 320. The VCTU 302 may comprise an integrated unit including the VCTU electric motor 304 and associated power-off brake 310, outboard brake 354, and position sensor 312, all of which may be supported by or enclosed, at least partially, within the VCTU housing 322. The VCTU housing 322 may include one or more mounting tabs 324 for mounting the VCTU 302 to the wing 116 structure of an aircraft 100.

Figure 14:
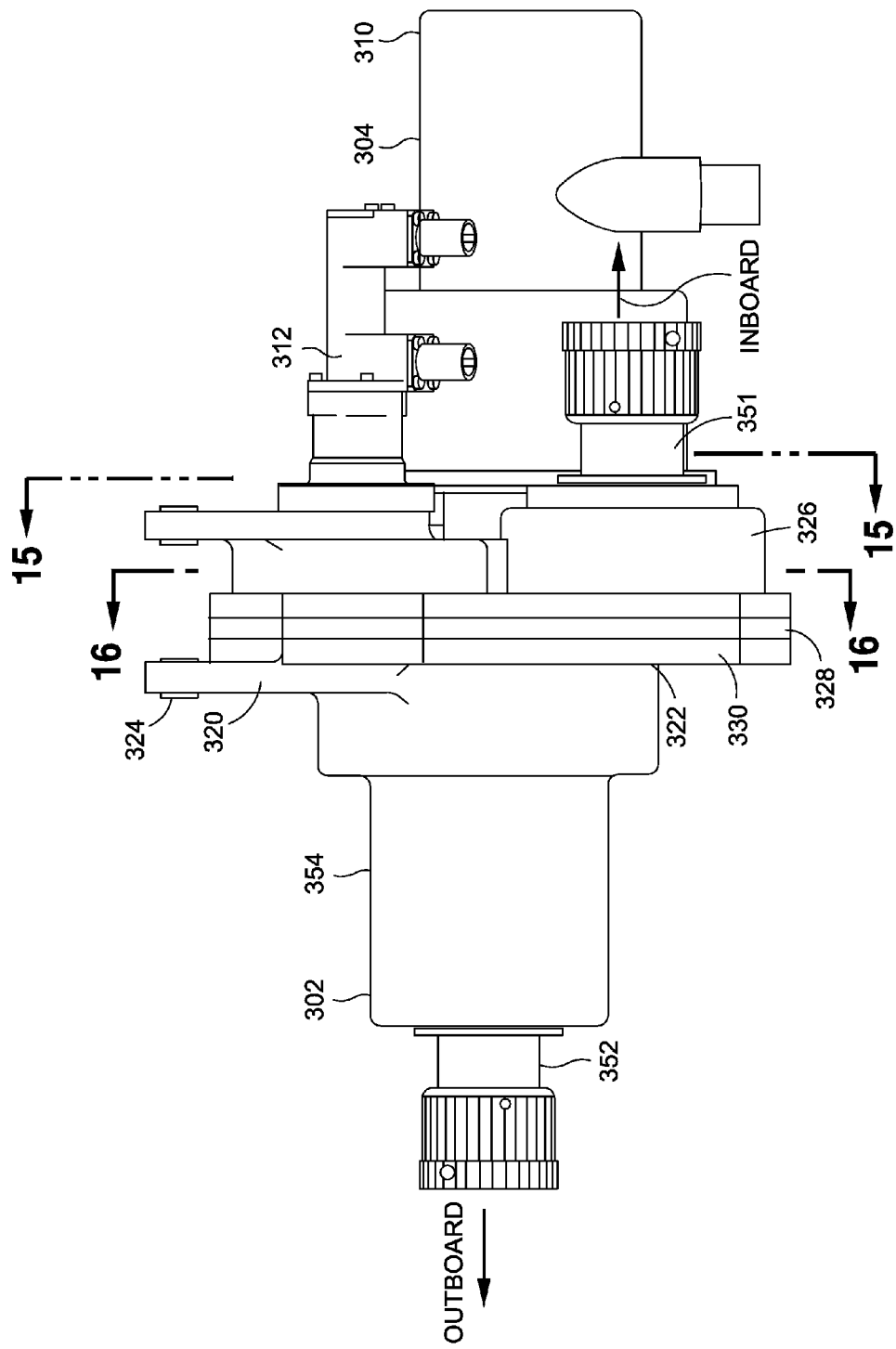
FIG. 14 is a forward-looking view of an aft side of the VCTU.

FIG. 14 is a forward-looking view of the VCTU 302 illustrating the VCTU housing 322. In an embodiment, the VCTU housing 322 may be made up of an inner housing 326 on the inboard side of the VCTU 302, an outer housing 330 on an outboard side of the VCTU 302, and a mid housing 328 sandwiched between the inner housing 326 and the outer housing 330. Although not shown, the inner housing 326, the mid housing 328, and the outer housing 330 may be mechanically coupled together such as with mechanical fasteners. The three-piece arrangement of the VCTU housing 322 may facilitate assembly and disassembly of the VCTU 302 such as for maintenance and inspection. Although not shown, the VCTU housing 322 may be sealed from the elements by a seal extending around a perimeter at the interface of the housings. The VCTU housing 322 may be configured to provide a relatively rigid load path for operational loads.

Figure 15:
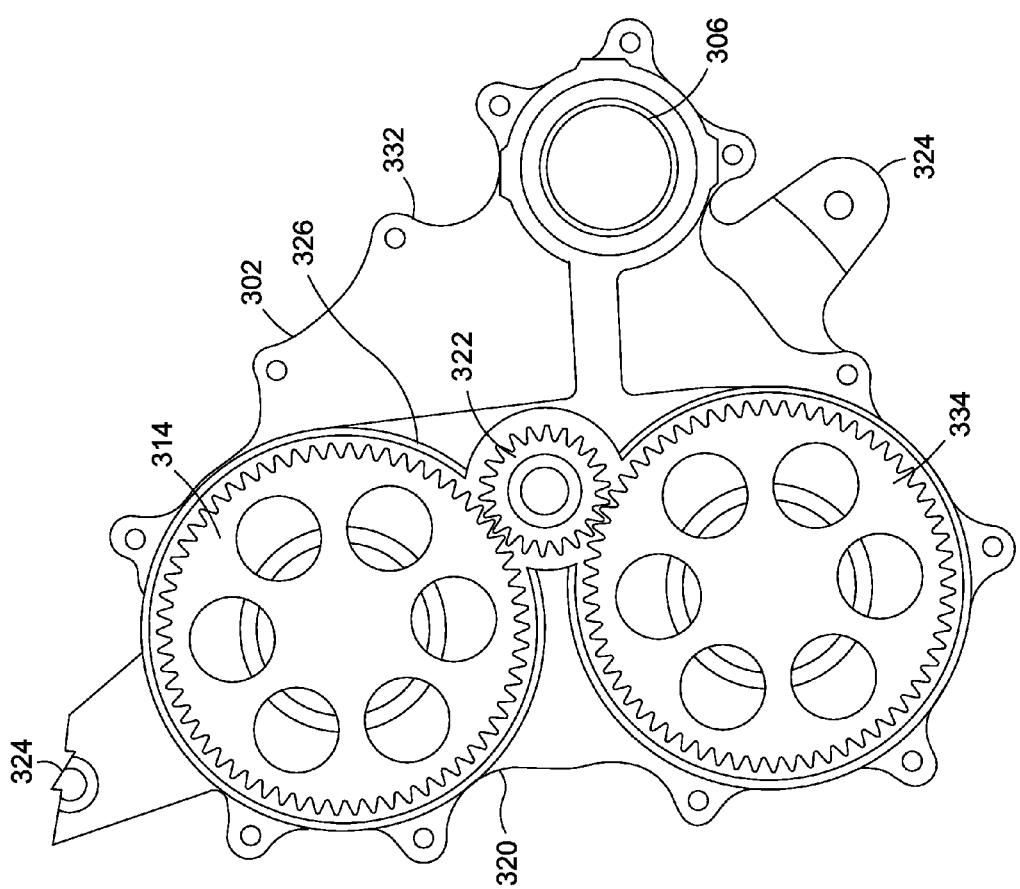
FIG. 15 is a sectional view of the VCTU taken along line 15 of FIG. 14 and illustrating the interconnectivity of an inboard pinion, an inboard gear, and a position sensor gear.

FIG. 15 is a sectional view of the VCTU 302 showing the inboard pinion 334 and the position sensor gear 314 operatively engaged to one another by the inboard gear 332. In an embodiment, the inboard gear 332 may be omitted, and the inboard shaft 351 may be directly coupled to the sun gear 346. In such an arrangement, the position sensor gear 314 may be engaged to another gear (not shown) that may be mounted on or integrally formed with the inboard shaft 351 to allow the position sensor 312 to sense the position of the inboard device 144 for transmitting a representative position signal to the flight control electronics 422.

Figure 16:
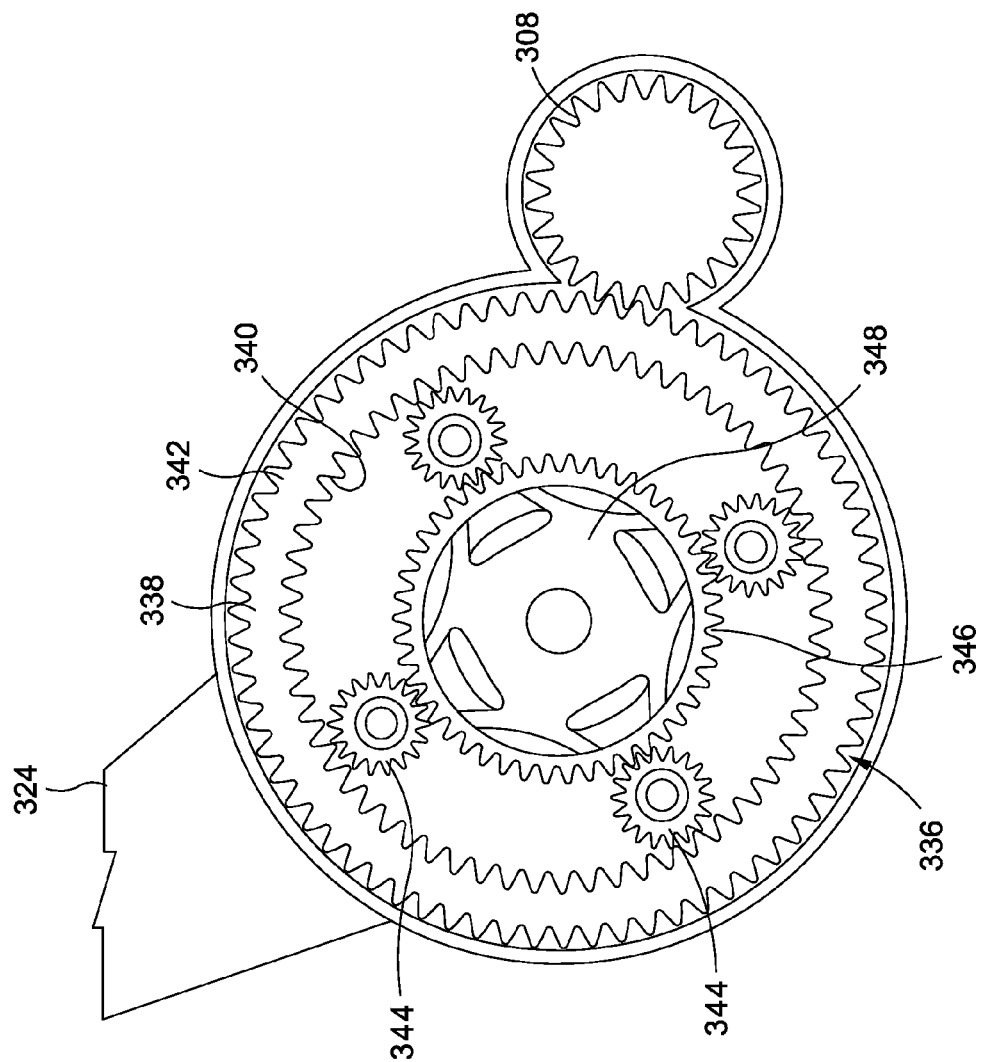
FIG. 16 is a sectional view of the VCTU taken along line 16 of FIG. 14 and illustrating the interconnectivity of a planetary gear system and the outboard brake.

FIG. 16 is a sectional view of the VCTU 302 showing the speed sum gearbox 320 configured as a planetary gear system 336. As indicated above, the speed sum gearbox 320 includes a central sun gear 346 having gear teeth and which is surrounded by a plurality of planet gears 344. The planet gears 344 are supported on the carrier 348 which may be fixedly mounted to the outboard shaft 352. The gear teeth of the planet gears 344 are engaged to the gear teeth on the internal side 340 of the ring gear 338 which circumscribes the planet gears 344. The motor pinion 308 of the VCTU electric motor 304 are engaged to the external side 342 of the ring gear 338.

Figure 17:
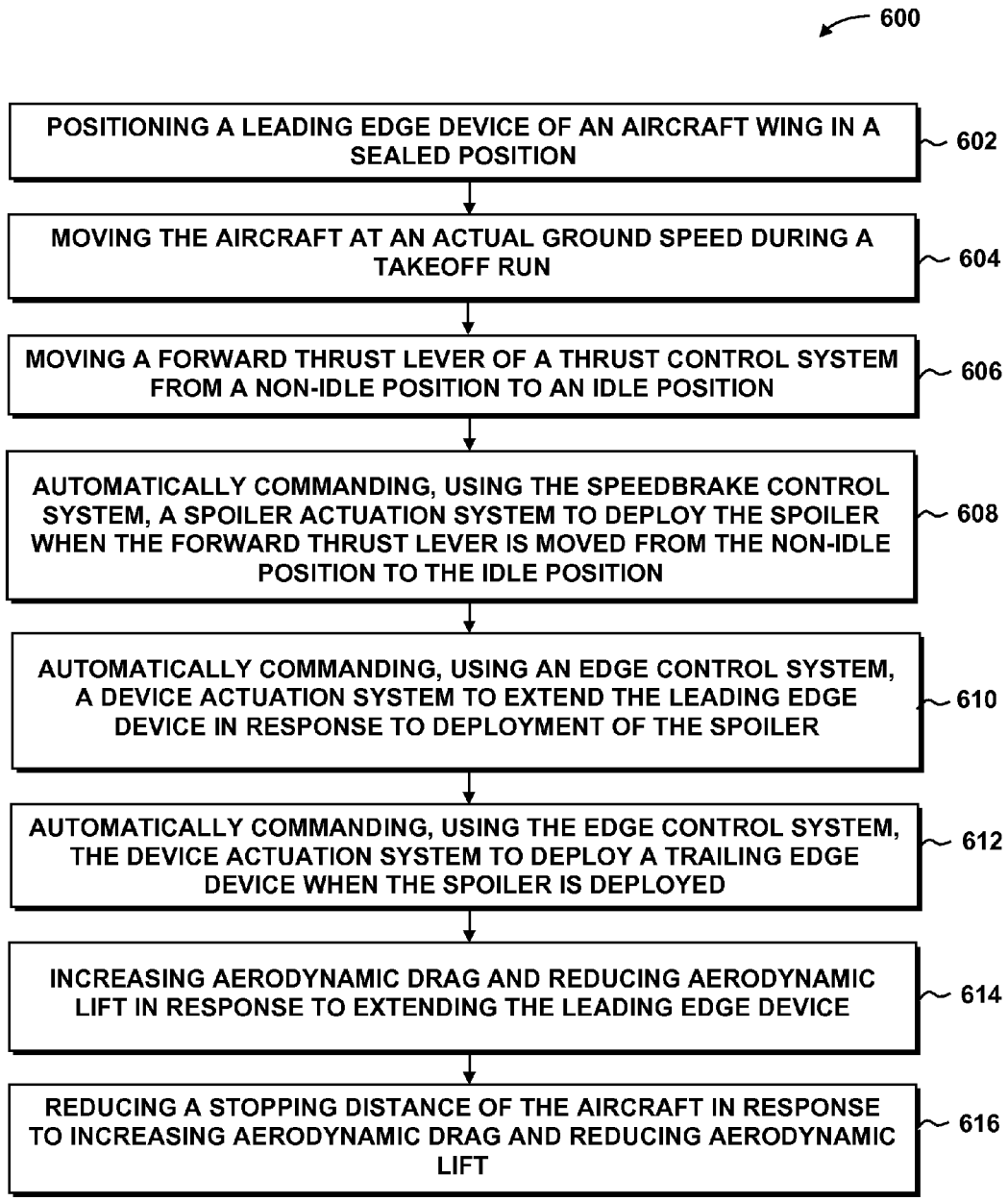
FIG. 17 is an illustration of a flow chart containing one or more operations that may be included in a method of operating a leading edge device to reduce the stopping distance of an aircraft.

In FIG. 17, shown is a flow chart containing one or more operations that may be included in a method 600 of reducing the stopping distance 586 (FIG. 2) of an aircraft 100 during a rejected takeoff or a landing. Step 602 of the method may include positioning a leading edge device 150 of an aircraft wing 116 in an initial position such as a partially extended and sealed position 182 during preparation for takeoff or landing. In the partially extended or sealed position 182, a portion of the slats 152 (e.g., the aft edge of the slats) may remain in contact with the wing upper surface 122. However, in an embodiment, the leading edge devices 150 may be maintained in a retracted position 158 (FIG. 3) or a gapped position. The process of configuring the aircraft 100 in the initial configuration 572 (e.g., the takeoff configuration or the landing configuration) prior to takeoff or landing may also include moving the flaps 242 to a desired flap setting such as the takeoff flaps setting 252 shown in FIG. 4 or the landing flaps setting shown in FIG. 5. The spoilers 290 may be maintained in the retracted position 291 as may the trailing edge devices such as the ailerons 288 and flaperons 286.

Step 604 of the method 600 of FIG. 17 may include advancing the forward thrust levers 534 (FIG. 5) from an idle position 538 to a non-idle position 540 such as to a takeoff thrust position (not shown) for takeoff, and to a reduced thrust setting non-idle position 540 for landing. For takeoff, the wheel brakes may be released allowing the thrust from the propulsion units 104 to accelerate the aircraft 100 down the runway 580. The method may include moving the aircraft 100 at an actual ground speed 562 during the takeoff roll or upon touchdown during a landing. As indicated above, an indication of the actual ground speed 562 may be continuously provided to the flight control computer 450 during the takeoff roll.

Step 606 of the method 600 of FIG. 17 may include moving one or more of the forward thrust levers 534 of the thrust control system 530 from the non-idle position 540 to the idle position 538 to initiate a rejected takeoff. The initiation of the rejected takeoff may include disengaging an autothrottle (not shown) which may result in activation of an autobrake system (not shown) to automatically apply maximum braking force to the wheels. As indicated above, the pilot or other flight crew member may initiate a rejected takeoff upon the occurrence of an event such as an engine failure, a blown tire, activation of a takeoff warning horn, instructions from air traffic control, or other events that may occur during the takeoff roll. Touchdown of the main landing gear 106 during a landing may also activate the autobrake system to automatically apply braking force to the wheels. During landing, moving one or more of the forward thrust levers to the idle position 538 after the main landing gear 106 touches down may also activate the autobrake system.

Step 608 of the method 600 of FIG. 17 may include deploying the spoilers 290 responsive, at least in part, to moving the forward thrust levers 534 from the non-idle position 540 to the idle position 538. In an embodiment, the method may include automatically commanding, using the speedbrake control system 500, the spoiler actuation system 504 to deploy the spoilers 290 when the forward thrust lever 534 is moved from the non-idle position 540 to the idle position 538. The spoilers 290 may be deployed at the maximum deflection angle 293 to maximize aerodynamic drag and minimize aerodynamic lift of the wings 116. The automatic deployment of the spoilers 290 may be included as part of an auto speed brake capability of the aircraft 100, and may be triggered when it is determined by the flight control computer 450 that the aircraft 100 is on the ground and the actual ground speed 562 exceeds the threshold ground speed 564 which may be preprogrammed into the flight control computer 450.

For example, a selected threshold ground speed 564 (e.g., 85 knots) may be preprogrammed into the flight control computer 450. During a takeoff roll or during a landing, the flight control computer 450 may receive an indication of the actual ground speed 562 of the aircraft 100 for comparison to the threshold ground speed 564. When flight control computer 450 determines that the actual ground speed 562 exceeds the threshold ground speed 564 and that the aircraft 100 is on the ground during a takeoff roll or a landing, the flight control computer may send a signal to the speedbrake control system 500 causing the speedbrake control system 500 to automatically command the speed actuation system to deploy the spoilers 290.

Step 610 of the method 600 of FIG. 17 may include automatically commanding, using the edge control system 452, the device actuation system 198 to further deploy the leading edge devices 150. If the actual ground speed 562 of the aircraft 100 exceeds the threshold ground speed 564, the method may include automatically commanding the leading edge devices 150 from a first position to a second position in response to deployment of the spoilers 290. The first position of the leading edge devices 150 may be a retracted position 158, a sealed position 182, or a partially-gapped or gapped position 184. The second position of the leading edge devices 150 may be a sealed position 182 or a gapped position 184. The autoslat system 300 may be configured to automatically move the leading edge devices 150 from any initial position (e.g., stowed, sealed, gapped) to a further deployed position (e.g., sealed, gapped) when the spoilers 290 are manually or automatically commanded to the deployed position 292. The spoilers 290 may also be manually deployed by the pilot manually moving the speedbrake lever 506 to the UP detent (FIG. 5).

The spoilers 290 may also be automatically commanded to the deployed position 292 in response to the forward thrust levers 534 being moved to the idle position 538 as part of an auto speed brake capability of the aircraft 100 during a rejected takeoff or a landing, and/or in response to an airplane-on-ground 566 indication during a landing. In an embodiment, during a rejected takeoff or a landing, the edge control system 452 may automatically command the device actuation system 198 to further extend an inboard leading edge device 144 and an outboard leading edge device 146 independent of one another. For example, the method may include moving an inboard leading edge device 144 independently of an outboard leading edge device 146. In some examples, the method may include extending the outboard leading edge device 146 prior to extending the inboard leading edge device 144 by operating the VCTUs 302 in conjunction with the leading edge PDUs 402. Independent actuation of the inboard and outboard leading edge devices 144, 146 may reduce actuation power requirements and/or hydraulic demand for the device actuation systems 198.

Step 612 of the method 600 of FIG. 17 may include deploying a trailing edge device 240 responsive, at least in part, to the deployment of the spoiler 290. In an embodiment, the method may include automatically commanding, using the edge control system 452, the device actuation system 198 to deploy one or more trailing edge devices 240 when the spoilers 290 are deployed. For example, upon deployment of the spoilers 290 during a rejected takeoff or a landing, the device actuation system 198 for the trailing edge devices 240 may automatically command the flaps 242 to the maximum deflection angle 256 which may correspond to the landing flaps setting 254 shown in FIG. 4. In an embodiment, the flaps 242 may also be differentially actuated to the maximum deflection angle 256 using VCTUs 302 operating in conjunction with the trailing edge PDU 404 in a manner similar to the above-described system for independently actuating the leading edge devices 150. The deployment of the spoilers 290 may also initiate the automatic deflection of the ailerons 288, flaperons 286, and other trailing edge devices 240 to the maximum deflection angle 256.

Step 614 of the method 600 of FIG. 17 may include reducing aerodynamic lift of the wings 116 and/or increasing aerodynamic drag in response to further extending the leading edge devices 150 and deploying the spoilers 290 and the trailing edge devices 240 to the maximum deflection angle 256, 293. As indicated above, further deployment of the leading edge devices 150 may alter the wing camber resulting in a reduction in aerodynamic lift of the wings 116. In addition, further deployment of the leading edge devices 150 may increase aerodynamic drag due to a larger frontal area of the leading edge devices 150, and due to turbulent airflow over the edges of the leading edge devices 150 and through the gap 180 (FIG. 2).

Step 616 of the method 600 of FIG. 17 may include reducing the stopping distance 586 (FIG. 2) of the aircraft 100 in response to reducing the aerodynamic lift of the wings 116 and increasing the aerodynamic drag of the aircraft 100. The lift generated by the wings 116 may be reduced by the further-deployed leading edge devices 150 which may alter the sectional lift characteristics of the wings resulting in a transfer of a portion of the aircraft 100 weight from the wings 116 to the landing gear 106 which may improve braking performance during a rejected takeoff or a landing.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A system for reducing a stopping distance of an aircraft, comprising:
an edge control system configured to control a leading edge device deployable from a leading edge of a wing of an aircraft on the ground;
a thrust control system including a thrust lever positionable in at least one of an idle position corresponding to an idle thrust setting and a non-idle position corresponding to a thrust setting different than the idle thrust setting;
a speedbrake control system automatically commanding deployment of a spoiler at least partially responsive to movement of the thrust lever from the non-idle position to the idle position when the aircraft is on ground and moving in excess of a threshold ground speed;
the edge control system automatically commanding extension of the leading edge device from a first position to a second position when the spoiler is automatically deployed by the speedbrake control system; and
a device actuation system deploying a trailing edge device to a maximum deflection angle at least partially responsive to deployment of the spoiler in conjunction with deployment or the leading edge device.

2. The system of claim 1, wherein:
the first position is a refracted position, a sealed position, or a gapped position;
and the second position is a sealed position or a gapped position.

3. The system of claim 1, wherein:
the trailing edge device comprises at least one of a flap, an aileron, and a flaperon.

4. The system of claim 1, further comprising:
a device actuation system communicatively coupled to the edge control system;
wherein the leading edge device is one of a plurality of leading edge devices coupled to the wing, the plurality of leading edge devices including an inboard leading edge device and an outboard leading edge device; and
the device actuation system is configured to actuate the inboard leading edge device independently of the outboard leading edge device.

5. The system of claim 4, wherein:
the edge control system is configured to automatically command the device actuation system to extend the outboard leading edge device prior to extending the inboard leading edge device.

6. The system of claim 4, wherein:
the device actuation system includes a variable camber trim unit (VCTU) positioned between the inboard leading edge device and the outboard leading edge device; and
the VCTU actuating the outboard leading edge device independent of the inboard leading edge device.

7. The system of claim 6, wherein the VCTU includes:
a speed sum gearbox including an inboard shaft coupled to the inboard leading edge device and an outboard shaft coupled to the outboard leading edge device;
a VCTU electric motor engaged to the speed sum gearbox; and
wherein the VCTU electric motor selectively operating in conjunction with the speed sum gearbox to rotate the outboard shaft independent of the inboard shaft in a manner causing the outboard leading edge device to be actuated independent of the inboard leading edge device.

8. An autoslat system for reducing a stopping distance of an aircraft, comprising:
an edge control system including a device actuation system configured to position a leading edge device deployable from a leading edge of a wing of an aircraft on the ground;
a thrust control system including a forward thrust lever positionable in one of an idle position and a non-idle position;
a speedbrake control system automatically commanding a spoiler actuation system to deploy a spoiler when the forward thrust lever is moved from the non-idle position to the idle position and the aircraft is on ground and moving in excess of a threshold ground speed; and
the edge control system automatically commanding the device actuation system to extend the leading edge device from a first extended position to a second extended position in response to deployment of the spoiler when the spoiler is automatically deployed by the spoiler actuation system and
a device actuation system deploying a trailing edge device to a maximum deflection angle at least partially responsive to deplyment of the spoiler in conjunction with deployment or the leading edge device.

9. A method of reducing a stopping distance of an aircraft, comprising:
moving a thrust lever from a non-idle position to an idle position;
automatically commanding, using a speedbrake control system,
deployment of a spoiler mounted on a wing of an aircraft at least partially responsive to moving the thrust lever from the non-idle position to the idle position when the aircraft is on ground and moving in excess of a threshold ground speed; and automatically commanding, using an edge control system, extension of a leading edge device on the wing from a first position to a second position in response to deployment of the spoiler by the speedbrake control system; and deploying a trailing edge device to a maximum deflection angle responsive, at least in part, to the deployment of the spoiler.

10. The method of claim 9, wherein the first position is a retracted position, a sealed position, or a gapped position and the second position is a sealed position or a gapped position.

11. The method of claim 9, wherein:
the trailing edge device comprises at least one of a flap, an aileron, and a flaperon.

12. The method of claim 9, further comprising:
moving an inboard leading edge device independently of an outboard leading edge device.

13. The method of claim 12, further comprising:
extending the outboard leading edge device prior to extending the inboard leading edge device.

* * * * *